United States Patent
Andersen et al.

(10) Patent No.: US 10,728,939 B2
(45) Date of Patent: *Jul. 28, 2020

(54) POINT-TO-POINT AD HOC VOICE COMMUNICATIONS

(71) Applicant: Apple Inc., Cupertino, CA (US)

(72) Inventors: Esge B. Andersen, Campbell, CA (US); Cedrik Bacon, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/112,555

(22) Filed: Aug. 24, 2018

(65) Prior Publication Data
US 2019/0082483 A1 Mar. 14, 2019

Related U.S. Application Data

(63) Continuation of application No. 15/633,468, filed on Jun. 26, 2017, now Pat. No. 10,064,233, which is a (Continued)

(51) Int. Cl.
*H04W 76/14* (2018.01)
*H04W 84/18* (2009.01)
(Continued)

(52) U.S. Cl.
CPC .......... *H04W 76/14* (2018.02); *G06F 3/0488* (2013.01); *G06F 3/04817* (2013.01);
(Continued)

(58) Field of Classification Search
CPC ... H04W 76/02; H04W 76/023; H04W 84/18; G06F 3/167; G06F 3/048; G10L 2015/223

See application file for complete search history.

(56) References Cited

U.S. PATENT DOCUMENTS

| 8,009,648 B2 | 8/2011 | Kuliner et al. |
| 8,401,532 B2 | 3/2013 | Frazier et al. |

(Continued)

FOREIGN PATENT DOCUMENTS

CN 102098797 6/2011

OTHER PUBLICATIONS

International Search Report and Written Opinion from PCT/US2015/062526, dated Mar. 1, 2016, Apple Inc. pp. 1-13.
(Continued)

*Primary Examiner* — Afshawn M Towfighi
(74) *Attorney, Agent, or Firm* — Fish & Richardson P.C.

(57) ABSTRACT

A wireless communication device establishes voice communication between a supported user and a selected remote device supporting another user via a point-to-point wireless ad hoc network link. The device selects a particular remote device, establishes an ad hoc network link with the selected remote device, and communicates voice communication signals with the selected remote device. Selection can be based upon a user interaction with the device which specifies the particular remote device. The user interaction can include interaction with a graphical representation of the particular remote device presented in a graphical user interface. The user interaction can include an audio command received via an audio interface of the device. The device can include one or more headset devices, including a pair of headset devices which can be switched between providing audio signals to a single user to supporting communication between separate users via an ad hoc network link.

18 Claims, 16 Drawing Sheets

Related U.S. Application Data continuation of application No. 14/552,155, filed on Nov. 24, 2014, now Pat. No. 9,693,375.

(51) Int. Cl.
*H04W 76/10* (2018.01)
*G06F 3/0488* (2013.01)
*G06F 3/0481* (2013.01)
*G06F 3/0484* (2013.01)
*G06F 3/16* (2006.01)
*G10L 15/22* (2006.01)
*G06F 3/0482* (2013.01)

(52) U.S. Cl.
CPC .......... *G06F 3/04842* (2013.01); *G06F 3/167* (2013.01); *H04W 76/10* (2018.02); *H04W 84/18* (2013.01); *G06F 3/0482* (2013.01); *G10L 2015/223* (2013.01)

(56) References Cited

U.S. PATENT DOCUMENTS

| | | | | |
|---|---|---|---|---|
| 9,693,375 | B2* | 6/2017 | Bacon | H04W 76/10 |
| 10,064,233 | B2* | 8/2018 | Andersen | H04W 76/10 |
| 2006/0029015 | A1* | 2/2006 | Hinsey | H04L 63/0853 370/328 |
| 2006/0128307 | A1 | 6/2006 | Levien et al. | |
| 2009/0017868 | A1 | 1/2009 | Ueda et al. | |
| 2010/0004023 | A1 | 1/2010 | Jabri et al. | |
| 2010/0064334 | A1* | 3/2010 | Blackburn | H04N 5/44591 725/110 |
| 2011/0124287 | A1* | 5/2011 | Bang | H04M 1/7253 455/41.2 |
| 2012/0011365 | A1 | 1/2012 | Schmidt et al. | |
| 2012/0157056 | A1* | 6/2012 | Wu | H04W 76/14 455/411 |
| 2012/0178369 | A1 | 7/2012 | Kim | |
| 2013/0077609 | A1 | 3/2013 | Mondal | |
| 2014/0093093 | A1 | 4/2014 | Dusan et al. | |
| 2014/0141723 | A1* | 5/2014 | Wang | H04W 76/15 455/41.2 |
| 2014/0269614 | A1* | 9/2014 | Maguire | H04W 4/80 370/331 |

OTHER PUBLICATIONS

Office Action from Chinese Application No. 201580065213.5, (Chinese Version, English Translation), dated Aug. 27, 2019, pp. 1-24.

* cited by examiner

POINT-TO-POINT AD HOC VOICE COMMUNICATIONS

This application is a continuation of U.S. patent application Ser. No. 15/633,468, filed Jun. 26, 2017, now U.S. Pat. No. 10,064,233, which is a continuation of U.S. patent application Ser. No. 14/552,155, filed Nov. 24, 2014, now U.S. Pat. No. 9,693,375, which are hereby incorporated by reference herein in their entirety.

BACKGROUND

Technical Field

This disclosure relates generally to communication via wireless networks, and relates particularly to voice communication via a wireless ad hoc network.

Description of the Related Art

In some cases, conditions for direct audio communication between users in close proximity may be less than ideal. For example, where two individuals are in close proximity in a noisy environment, direct (i.e. spoken) audio communication between the individuals may be difficult in view of interference from ambient noise, which can hinder one or both individuals from being able to distinguish words spoken by the other individual. Such ambient noises may require both individuals to approach within a certain proximity of each other, which can hinder freedom of movement of one or both users for the duration of the direct communication. In some cases, unhindered freedom of movement of one or both users may be desirable. For example, the users may desire to maintain a minimum distance between each other for cultural reasons, lack of familiarity with each other, a desire to avoid impinging upon each other's personal space, a desire to minimize contact with bodily odors and discharges of other individuals, some combination thereof, etc.

While the advent of mobile communication devices, including cellular communication devices, satellite communication devices, Internet communication systems, etc., has enabled mobile communication among individuals in a variety of locations, mobile communication systems may not be ideal for enabling communication between users in close proximity with each other. In particular, many mobile communication systems, including cellular communication systems, satellite communication systems, Voice over IP (VoIP) communications using an Internet connection, communications using a Wi-Fi® LAN connection, etc. can have latencies (e.g., 500 milliseconds) which can result from signals between devices being routed through various network nodes between the two devices (e.g., routers, cell towers, satellites, etc.). Such latencies can, in close-proximity settings, hinder communications between users. For example, where two users communicating with each other via cellular communication devices over a cellular network are within sufficiently close proximity such that a user can perceive body gestures and at least some vocal sounds generated by the other user, latencies associated with the cellular connection can result in a perceptible temporal discontinuity between audio signals received from the other user via an audio interface of the user's cellular device and the directly-observed body gestures and sounds of the other user.

Furthermore, configurations of many communication devices can complicate, if not outright hinder, close-proximity audio communications between users, as time requirements involved in establishing audio communication with particular users can have a pronounced effect when users are in close proximity. For example, a user desiring to establish audio communication with another user in close proximity via a cellular phone may need to access a contact address database in the cellular phone via a contact address application, navigate to a contract entry in the database which is associated with the other user, identify and select a contact address in the entry, and wait for a connection link to be established with another cellular phone of the other user, all while the other user remains in close proximity. Such a process can impose time delays, in addition to the above-described latencies, on voice communication which can be more pronounced when the users desiring to communicate are within close proximity. In some cases, the process for establishing a voice communication session over communication devices can require more time than the session itself. In addition, where a user desires to initiate voice communication with a another user for whom the user does not have a present contact address entry, the above process can be lengthened by a process of acquiring contact address information, inputting such information into the user's communication device, etc. Such a configuration is less than ideal.

SUMMARY OF EMBODIMENTS

Some embodiments provide a device which is configured to enable voice communication between a supported user and at least one remote user via a point-to-point wireless ad hoc network link. The device comprises a wireless communication transceiver, an audio communication interface, and a point-to-point voice communication module. The wireless communication transceiver is configured to communicate with one or more remote devices supporting at least one remote user via a point-to-point wireless ad hoc network link. The audio communication interface is configured to communicate voice communication signals between an audio interface of the device and the wireless communication transceiver. The point-to-point voice communication module is interoperable with the wireless communication transceiver and audio communication interface to establish a point-to-point wireless ad hoc network link with a selected remote device, of the one or more remote devices, and communicate voice communication signals with the selected remote device via the link, based at least in part upon a user interaction with the device which identifies a particular remote device as the selected remote device and commands establishing point-to-point wireless ad hoc voice communication with the selected remote device.

The device can include an interface module configured to provide, to the supported user, an identification of at least some of the plurality of remote devices. In some embodiments, the user interface module is configured to provide, to the supported user, an audio identification of at least some of the plurality of remote devices via the audio interface of the device; and the user interaction with the device comprises an audio command, received via the audio interface, which identifies the particular remote device as the selected remote device and commands establishing point-to-point wireless ad hoc voice communication with the selected remote device. In some embodiments, the user interface module is configured to provide, to the supported user, a graphical user interface comprising a plurality of separate graphical representations which are each associated with a separate remote device of the plurality of remote devices; and the user interaction with the device comprises a user interaction with a particular graphical representation, of the plurality of graphical representations, which is associated with the particular remote device.

In some embodiments, the device comprises a wireless communication headset device configured to establish a point-to-point wireless ad hoc network link with at least one remote wireless communication headset device supporting at least one remote user. The wireless communication headset device can be comprised in a pair of headset devices configured to exchange voice communication signals via a wireless ad hoc network link to collectively provide a stereo audio experience for a single supported user and switch from collectively providing the stereo audio experience for the single user to individually supporting a separate supported user and exchanging voice communication signals between the separate supported users via the wireless ad hoc network link, based at least in part upon user interaction with one or more user interfaces included in one or more of the pair of headset devices. The point-to-point voice communication module can be interoperable with the wireless communication transceiver and audio communication interface to present, to a supported user, an audio message which includes an identification of a plurality of remote devices and a query to select one or more remote device of the plurality of remote devices for voice communication via a point-to-point wireless ad hoc network link, and select a particular remote device, from the plurality of remote devices, as the selected remote device and establish a point-to-point wireless ad hoc network link with the selected remote device based at least in part upon receiving an audio command from the supported user to establish voice communication with the particular remote device.

In some embodiments, the audio interface comprises at least one microphone device, and the audio communication interface is configured to at least partially filter ambient noise, relative to sounds generated by the supported user, from audio signals received at the microphone device to generate filtered audio signals, such that the voice communication signals communicated via the wireless ad hoc network link comprise the filtered audio signals. In some embodiments, the point-to-point wireless ad hoc network link comprises a point-to-point mobile ad hoc network link.

Some embodiments provide a method performed, by at least one wireless communication device supporting a user, which includes exchanging voice communication signals with at least one remotely located wireless communication device via a point-to-point wireless ad hoc network link, based at least in part upon determining a user-initiated selection of the at least one remotely located wireless communication device via at least one user interface of the at least one wireless communication device. Exchanging voice communication signals can include identifying a plurality of remotely-located devices within a geographical proximity of the at least one computer device and establishing the point-to-point wireless ad hoc network link with the at least one particular remotely-located device, based at least in part upon determining a user-initiated selection of the at least one remotely located wireless communication device from the plurality of remotely located devices via at least one user interface of the at least one wireless communication device.

In some embodiments, providing an indication of at least a portion of the plurality of remotely located devices to the user via at least one user interface of the at least one wireless communication device comprises providing a graphical user interface comprising graphical representations individually associated with separate remotely located devices of at least a portion of the plurality of remotely located devices. In some embodiments, determining a user-initiated selection of the at least one remotely located wireless communication device from the plurality of remotely located devices via at least one user interface of the at least one wireless communication device comprises determining a user interaction with a particular graphical representation, comprised in the graphical user interface, which is associated with the at least one particular remotely located device.

Providing an indication of at least a portion of the plurality of remotely located devices to the user via at least one user interface of the at least one wireless communication device can include providing, to the user via an audio interface, an audio indication of at least a portion of the plurality of remotely located devices. Determining a user-initiated selection of the at least one remotely located wireless communication device from the plurality of remotely located devices via at least one user interface of the at least one wireless communication device can include determining a receipt, via the audio interface of an audio command selecting the at least one particular remotely located device.

Some embodiments provide a non-transitory computer readable storage medium comprising a program of instructions that, when executed by one or more computer systems included in at least one wireless communication device supporting a user, cause at least a portion of the at least one wireless communication device to exchange voice communication signals with at least one remotely located wireless communication device via a point-to-point wireless ad hoc network link, based at least in part upon determining a user-initiated selection of the at least one remotely located wireless communication device via at least one user interface of the at least one wireless communication device.

Figure 1:
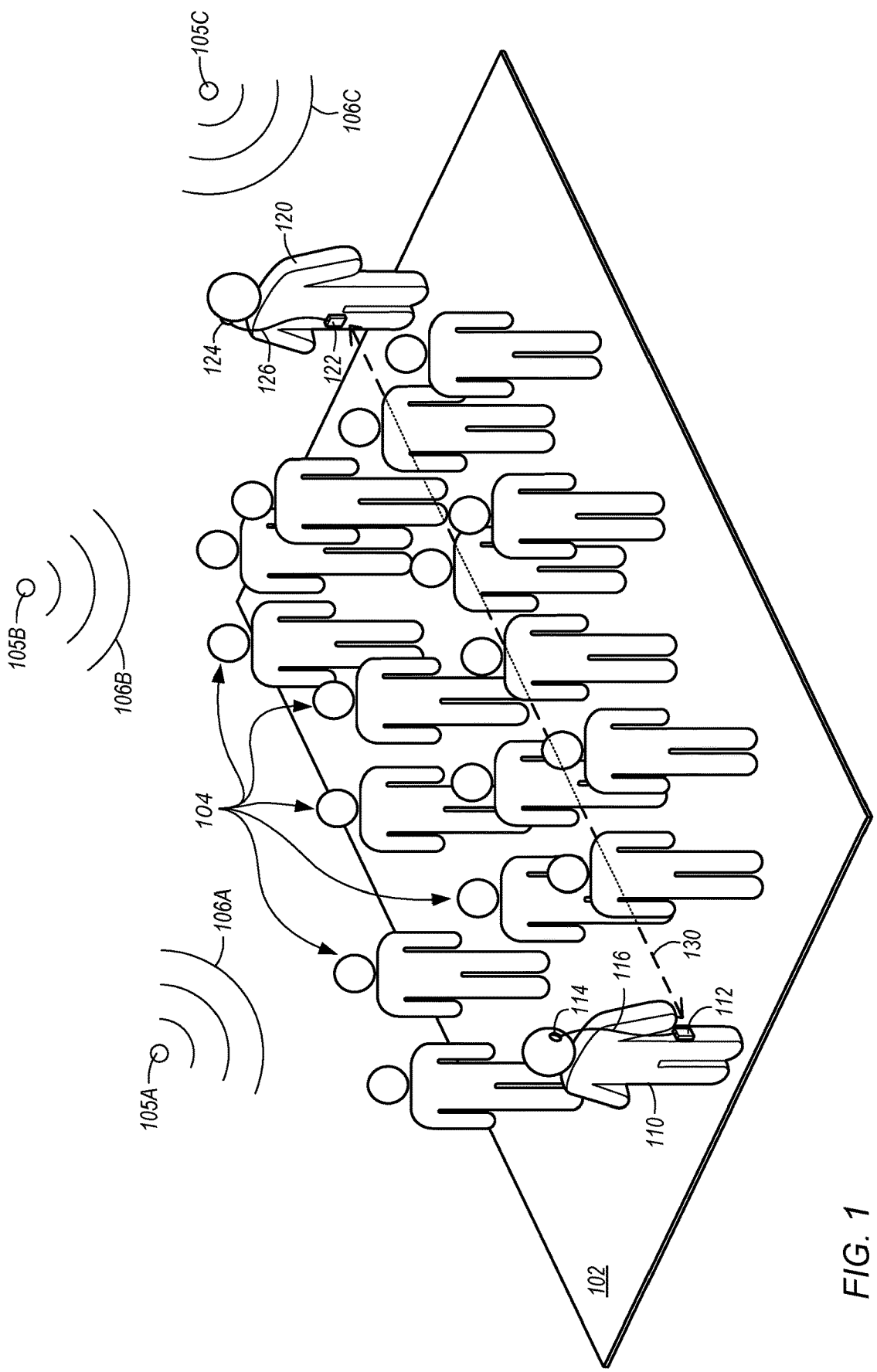
FIG. 1 illustrates users communicating via a point-to-point wireless ad hoc network link between wireless communication devices supporting the respective users, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

In some embodiments, a wireless communication device is configured to enable voice communication between a supported user of the wireless communication device and one or more other users supported by one or more remotely located wireless communication devices, referred to herein as "remote devices", via one or more wireless ad hoc network links between the wireless communication device can the one or more remote devices. The wireless ad hoc network links can be peer-to-peer links, also referred to herein as point-to-point links, such that intermediary devices (e.g., routers, signal relays, cellular towers, etc.) are absent in a link between two wireless communication devices. Such links can be referred to as "direct" links between the devices.

Voice communication between users over a wireless ad hoc network link between separate devices supporting the respective users can enable low-latency voice communication between users in close proximity. The absence of intermediary devices in a point-to-point wireless ad hoc network link can result in reduced latency of the link, relative to links established via other communication systems (e.g., cellular communications, communications via a network established by a network router, satellite communications, etc.). As a result, where two individuals are in close proximity in a noisy environment, and direct (i.e. spoken) audio communication between the individuals may be difficult in view of interference from ambient noise, which can hinder one or both individuals from being able to distinguish words spoken by the other individual, the point-to-point wireless ad hoc network link between separate devices supporting a separate one of the respective users can augment communications between the two users. For example, where two users communicating with each other via a point-to-point wireless ad hoc network link between separate devices supporting a separate one of the respective users are within sufficiently close proximity such that a user can perceive body gestures and at least some vocal sounds generated by the other user, the lower latency associated with the point-to-point wireless ad hoc network link can result in a negligible perceptible, if not imperceptible, temporal discontinuity between audio signals received from the other user via an audio interface of the user's cellular device and the directly-observed body gestures and sounds of the other user. For example, an audio signal received from a device supporting a proximate individual via a point-to-point wireless ad hoc network link having a latency of approximately 20-25 milliseconds may be perceived to be received simultaneously with directly hearing said audio signal generated by the proximate individual and direct visual observation of body gestures generated by the proximate individual (e.g., mouth movements) associated with such audio signals. Thus, a mitigation of discontinuity between audio signals provided to a user from a supporting device via an audio interface and direct audio signals received directly from the another user and observed body gestures of the other user can result in a seamless communication experience for the supported user.

Furthermore, voice communication between users over a wireless ad hoc network link between separate devices supporting the respective users can enable the users to engage in discreet communications which are not easily overheard by other proximate individuals (e.g., communication between two individuals in a crowded room) while retaining freedom of movement of the respective users. As wireless ad hoc network links can include signal encryption, discreetness of the voice communication between users via the wireless ad hoc network link can be enhanced, relative to other broadcast-based communication systems (e.g., communication via two-way radio transceivers, sometimes referred to as "walkie-talkie" devices). As a result, because the users can communicate over secure wireless communication links while retaining freedom of movement within a "range" of each other based on the wireless communication transceivers of the devices supporting the users, the existence of communication between a particular group of two or more individuals may not be visually apparent, as the individuals may not be huddled in close proximity to enable the individuals to distinguish directly spoken words over ambient noises.

In some embodiments, a wireless communication device is configured to enable point-to-point voice communication between a supported user and one or more users supported by one or more particular remote devices over a wireless ad hoc network link, based at least in part upon a selection of the particular remote devices. The particular remote devices can be selected based at least in part upon user interaction with the wireless communication device, including interaction with a graphical user interface (GUI), interaction with an audio interface, some combination thereof, etc. For example, the wireless communication device can present a GUI which includes interactive graphical representations of various remote devices with which the wireless communication device can presently establish a point-to-point wireless ad hoc network link and exchange voice communication signals to enable voice communication over the link. A graphical representation can include indications of one or more particular users associated with the device associated with the representation, indications of one or more particular users presently supported by the device, etc. The wireless communication device can, in response to a user interaction with a graphical representation associated with a particular remote device, establish a point-to-point wireless ad hoc network link with the "selected" remote device and exchange voice communication signals with said device. As a result of enabling point-to-point voice communication with "selected" remote devices, which can be based at least in part upon identities of particular users associated with the selected remote devices, supported by the selected remote devices, etc., a user supported by the wireless communication device can communicate with selected users via a point-to-point wireless ad hoc network link. As a result, a user can be presented, via a user interface of the wireless communication device, with indications of particular other users with which the user can engage in voice communication via a point-to-point wireless ad hoc network link; the user can interact with the interface to indicate which users, devices, etc. with which the user desires to communicate. Such presentation and selection of particular remote devices via a user interface can enable rapid establishment of voice communication with particular users, thereby augmenting communication.

In some embodiments, voice communication via a point-to-point ad hoc network link can be augmented via various noise filtering and processing systems which can filter ambient noise out of audio signals received at an audio interface associated with a wireless communication device. Such filtering can result in voice communication signals which comprise audio signals generated by the user, also referred to herein as "user noise", and are at least partially filtered of ambient noise which is not generated by the user, resulting in audio signals in which the user-generated audio signals are more easily distinguishable than via direct hearing of the user-generated audio signals. Transmission of such voice communication signals via the point-to-point ad hoc network link can mitigate degradation of such voice communication signals, thereby enabling enhanced communication between users in a space with ambient noise, relative to direct communication between the users where user-generated audio signals may be difficult to distinguish from the ambient noise and may be intercepted by other individuals.

In some embodiments, voice communication via a point-to-point ad hoc network link can enable "conference call" voice communication sessions between users supported by wireless communication devices linked together via one or more point-to-point ad hoc network links. In some embodiments, such a linking of multiple devices can resemble a mesh network topology, where each wireless communication device is directly linked to every other device via separate point-to-point ad hoc network links. In some embodiments, such a linking can resemble a star network topology, where a set of wireless communication devices engaged in a "conference call" voice communication session include a primary device and secondary devices, where the secondary devices are linked to the primary device via separate point-to-point ad hoc network links with the primary device and are thus communicatively linked to each other indirectly via the primary device.

In some embodiments, voice communication via one or more point-to-point ad hoc network links can enable "conference call" voice communication sessions between users supported by wireless communication devices linked together via the point-to-point ad hoc network link and at least one other device which is linked to at least one of the wireless communication devices via another communication link. For example, referring to the above example where a set of wireless communication devices includes a primary device linked to one or more secondary wireless communication devices via separate point-to-point ad hoc network links, the primary device can be linked to another device via a cellular network link. As a result, communication signals can be exchanged between the other device and the secondary devices via the cellular link between the other device and the primary device and the point-to-point ad hoc network links between the primary device and the secondary devices. The other communication link, which can be referred to herein as a separate communication link, can be understood to encompass any known communication links, including cellular network communication links, network links via a router, satellite communication links, telephonic communication links, radio communication links, etc.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick. In some embodiments, the device includes one or more user interfaces. In some embodiments, the one or more user interfaces include a touch-sensitive surface, which can include a touchscreen interface. It should be understood that at least some of the user interfaces included in the device can include interfaces other than touchscreen interfaces, including button interfaces, switch interfaces, etc. In some embodiments, the device is restricted to including user interfaces which are not touchscreen interfaces.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

FIG. 1 illustrates users communicating via a point-to-point wireless ad hoc network link between wireless communication devices supporting the respective users, according to some embodiments.

FIG. 1 illustrates a space 102 which comprises multiple individuals 104 and multiple noise generation elements 105A-C which each generate ambient noise 106A-C. Noise generation elements can include one or more various source of noise, including audio speakers associated with sound systems, sounds generated by various individuals 104 in space 102, noise generated by one or more mechanical devices during operation, one or more noisemaker devices, etc. As referred to herein, a space 102 can include a room of a structure, a limited volume of a larger enclosure volume, a limited area of an exterior area in an ambient environment, etc.

In some embodiments, wireless communication devices supporting separate individuals, herein referred to as "users" supported by the respective devices, enable voice communication between two or more users via point-to-point wireless ad hoc network links between two or more such wireless communication devices. A wireless communication device can establish a point-to-point wireless ad hoc network link with a selected remote device supporting a particular user and exchange voice communication signals with the selected remote device to enable voice communication between the supported user and the particular supported user, based at least in part upon a user interaction with the wireless communication device.

In the illustrated embodiment, individuals 110, 120, referred to interchangeably herein as "users" 110, 120, are linked via a point-to-point wireless ad hoc network link 130 between separate wireless communication devices 112, 122 which each support a separate one of the users 110, 120. The users 110, 120 can engage in voice communication via the link 130, based at least in part upon audio interface devices 114, 124 coupled to the respective supporting wireless communication devices 112, 122 via connections 116, 126. A given user 110 can generate audio signals, which can include generating sounds via vocal action, including spoken words, which can be captured by the audio interface device 114 and communicated to the wireless communication device 112 supporting the user 110, where the device 112 can communicate the audio signals generated by the user, as electronic signals (also referred to herein as "voice communication signals"), to a remote device 122 via link 130, where the device 122 can provide the voice communication signals as audio signals to user 120 via interface device 124. As referred to herein, audio signals converted to electronic signals, digital signals, etc. can be referred to as voice communication signals.

Voice communication between users 110, 120 via link 130 between devices 112, 122 can enable communication of audio signals which are more distinguishable from ambient noise 106 than direct communication of audio signals between users 110, 120 across the intervening physical space between them in space 102, where ambient noise 106A-C can interfere with such direct communication and complicate distinction of user-generated audio signals from ambient noise. In other words, ambient noise 106A-C can reduce a "signal to noise ratio" of user-generated audio signals relative to ambient noise when directly communicated across a physical space, thereby complicating distinguishability, by one or more individuals, of the user-generated audio signals against the ambient noise. Furthermore, because voice communication signals exchanged between devices 112, 122 over link 130 may not be degraded, interfered with, etc. by ambient noise 106A-C, communications between users 110, 120 can be at least partially insulated from disruption by variations in ambient noises 106A-C generated by various ambient noise sources 105A-C over time.

In addition, where other individuals 104 are present in space 102, communication of audio signals between users 110, 120 via communication of voice communication signals between devices 112, 122 over link 130 can preclude interception of such audio signals by other individuals 104, which can enable private, discreet communications between users 110, 120 while permitting the users 110, 120 to have sufficient freedom of motion that other individuals 104 can be physically located between the users 110, 120 without the communications between users 110, 120 being audibly intercepted by other individuals 104. Furthermore, because the users 110, 120 can communicate via link 130 without requiring the users to preclude other individuals 104 from being located between the users 110, 120 or nearby the users 110, 120, visual appearance of a conversation between users 110, 120 to individuals 104 can be mitigated: while users 110, 120 may be separately visually perceived to be speaking into a respective interface 114, 124, the fact that user 110 is communicating with user 120, and that user 120 is communicating with user 110, may not be visually apparent as the users 110, 120 may not be visually appearing to be interacting with each other. Furthermore, as communications via link 130 can be at least partially encrypted, security of conversations over link 130 can be enhanced, relative to direct communication across some physical portion of space 102. Also, because establishment of link 130 can be based at least in part upon one or more of users 110, 120 separately interacting with one or more users interfaces of the respective supporting device 112, 122, link 130 can be established without requiring physical interactions between users 110, 120, thereby further reducing external indications that users 110, 120 are in communication relative to interactions between users 110, 120 via other communication systems, including cellular communication systems, which may require users 110, 120 to physically verify their common presence in space 102, confirmation of respective contact information, etc. prior to establishing communications between themselves.

Figure 2:
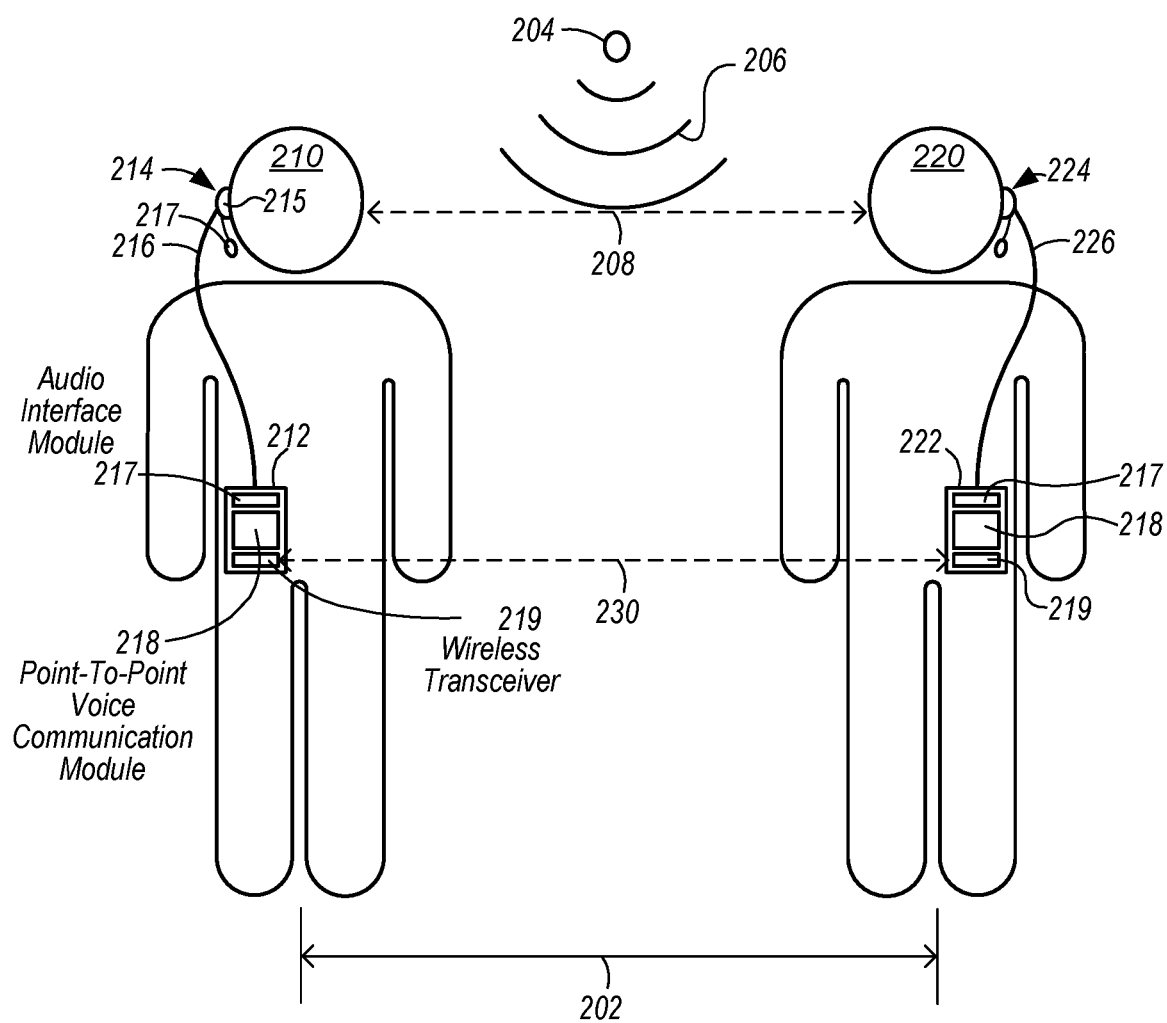
FIG. 2 illustrates wireless communication devices supporting separate users and enabling voice communication between the separate users via a point-to-point wireless ad hoc network link between the wireless communication devices, according to some embodiments.

FIG. 2 illustrates wireless communication devices supporting separate users and enabling voice communication between the separate users via a point-to-point wireless ad hoc network link between the wireless communication devices, according to some embodiments. The illustrated users 210, 220, wireless communication devices 212, 222, point-to-point wireless ad hoc network link 230 between same, some combination thereof, and the like can be included in any of the above embodiments described herein.

Space 200 includes two separate users 210, 220 physically separated by a physical distance 202 and at least one ambient noise source 204 which is generating ambient noise 206. As used herein, the physical distance by which separate users are separated can approximate the physical distance by which separate devices supporting the separate users are separated. Physical distance can be referred to herein as "proximity", "physical proximity", etc.

Each user 210, 220 is supported by a respective wireless communication device 212, 222, which can be carried by the respective supported user of the device, stored in a support device, article of clothing, etc. associated with the respective support user, some combination thereof, etc. In some embodiments, a user being supported by a device includes a user which is associated with the device. Association with a device can include having access to at least some functions associated with the device, being associated with a user account which enables access to at least some functions of the device, some combination thereof, etc. In some embodiments, a user presently being supported by a device is one of multiple users associated with the device.

In some embodiments, a wireless communication device supporting a user can select a particular remote device, of one or more particular remote devices within a sufficiently close proximity that a wireless ad hoc network connection can be established with the one or more remote devices. Such a "sufficiently close" proximity can be based on the capabilities of a wireless communication transceiver; the proximity which is "sufficiently close" can vary based at least in part upon the external environment, including the presence of various structures, materials, etc. Multiple remote devices can be within sufficiently close proximity, and a selection can be made of a particular remote device from the multiple devices. In the illustrated embodiment, users 210, 220 are within a certain physical proximity 202 from each other; where such a proximity 202 is no more than the range at which one or more of devices 212, 222 can establish point-to-point wireless ad hoc network links with each other, the devices 212, 222 can be considered to be "sufficiently close" so as to be "in range" of each other.

In some embodiments, a particular remote device is selected as a "selected" remote device with which a wireless ad hoc network link will be attempted to be established, such that voice communication signals can be exchanged with the selected remote device over the wireless ad hoc network link. For example, wireless communication device 212 can, based on a user interaction initiated by user 210 with one or more user interfaces of device 212, select device 222 from one or more devices within range of device 212. One or more portions of device 212 can, upon selecting device 222, establish a point-to-point wireless ad hoc network link 230 with one or more portions of device 212. Voice communication signals can be exchanged between devices 212, 222 via link 230.

In some embodiments, communication between two or more users via a point-to-point wireless ad hoc network link between devices supporting the respective users can provide enhanced intelligibility of audio signals (e.g., spoken words) generated by the various users and communicated between devices as voice communication signals, relative to direct communication of such audio signals between the various users across a physical distance, where ambient noise can detrimentally affect a signal to noise ratio of such directly-communicated audio signals against ambient noise, thereby complicating distinguishability of such audio signals against the ambient noise. For example, in the illustrated embodiment, the physical proximity 202 between users 210, 220 can be sufficiently small that direct communication 208 of audio signals generated by one or more users to the other user can be attempted, but ambient noise 206 generated by one or more ambient noise sources 204 can interfere with such direct communication 208 by disrupting the direct communication of audio signals generated by one or more users by the other users. Conversion of such audio signals generated by the users into voice communication signals, and exchanging such signals between devices supporting said users via link 230, can preclude disruption of said audio signals by ambient noise 206 through direct communication. Audio signals can be converted between audio signals and voice communication signals at the wireless communication devices, some devices coupled to the wireless communication devices, etc. In some embodiments, such conversion of audio signals into voice communication signals can include processing of the audio signals to at least partially remove ambient background noise from said audio signals. As a result, audio signals provided to a user from a supported wireless communication device, where the provided audio signals are converted from voice communication signals received over the point-to-point wireless ad hoc network link, can be filtered from ambient noise and can therefore be more intelligible to the user than audio signals directly received from another remote user across a physical distance.

In the illustrated embodiment, each wireless communication device 212, 222 includes an audio interface module 217, a wireless transceiver module 219, and a point-to-point voice communication module 218. The audio interface module 219 can receive audio signals from a user and provide, to the user, audio signals generated from conversion of voice communication signals received over the link 230. In some embodiments, audio interface module 219 can process audio signals received from a user to at least partially remove, filter, etc. ambient noise out of the audio signals, so that the resulting audio signals include audio signals generated by the user (e.g., spoken words) and are at least partially filtered of ambient noise. In some embodiments, the wireless communication device including the module 219 includes one or more audio interfaces, including speakers, microphones, etc. In some embodiments, the wireless communication device includes an interface, including a headset jack, etc. which communicates signals between an external device, including a headset device, and the audio interface module. In some embodiments, audio signals are converted between audio and electrical signals at the external device, such that the audio interface module communicates voice communication signals with the external device.

In some embodiments, one or more of devices 212, 222 includes one or more user interfaces via which a user can interact with one or more portions of the respective device. Such user interfaces can include one or more display interfaces on which one or more graphical user interfaces (GUIs) can be displayed to the user, one or more audio interfaces, one or more physical interfaces including one or more buttons, switches, etc.

Wireless transceiver module 219, which can comprise one or more wireless transceivers, can generate one or more wireless ad hoc networks, detect and communicate with various remote devices via one or more wireless ad hoc networks, etc. In some embodiments, module 219 can communicate information, including voice communication signals, with one or more remote devices via one or more links 230.

Point-to-point voice communication module 218 can select one or more particular remote devices as selected remote devices and command one or more of establishing a wireless ad hoc network link with the selected remote devices, communicating voice communication signals with the selected remote devices over said link, etc. In some embodiments, module 218 selects one or more particular remote devices based on one or more user interactions, initiated by a user supported by the wireless communication device comprising module 218, which result in one or more of a generation of a user command to module 218 to select the one or more particular remote devices, a generation of a user command to establish a point-to-point wireless ad hoc network link with the one or more particular remote devices, a generation of a user command to enable voice communications with one or more users supported by the one or more particular remote devices via a point-to-point wireless ad hoc network link, some combination thereof, etc. In some embodiments, module 218 is interoperable with one or more of module s 217, 219 to implement such selection, establishing, communicating, etc.

In some embodiments, one or more of modules 217-219 are implemented by one or more computer systems. In some embodiments, a given module is implemented as an instance of hardware. As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer. In some embodiments, at least some portion of a module is implemented as a set of program instructions stored on a non-transitory computer readable storage medium. In some embodiments, such a set of program instructions can be referred to as an "application".

In some embodiments, a wireless communication device is coupled to one or more external devices which enable communication of audio signals between a user supported by the wireless communication device and the wireless communication device itself. Such external devices can include one or more audio interfaces which can communicate audio signals between the user and a processing circuitry which convers between audio signals and voice communication signals. Such processing circuitry can be associated with an audio interface module of the wireless communication device, the external device, some combination thereof, or the like.

In the illustrated embodiment, each user 210, 220 supported by a respective wireless communication device 212, 222 has a respective headset device 214, 224 which is connected to an interface (e.g., a headset device jack) of the respective wireless communication device 212, 222 via a connection 216, 226. In some embodiments, a connection 226 is a wireless network link via one or more network protocols, including a Bluetooth® link. Each headset device 214, 224 includes a speaker device 215 and a microphone device 216. A headset device can both receive audio signals from a user 210, 220, via the microphone device 216, and provide audio signals to the user, via the speaker device 215. A headset device, in some embodiments, can include processing circuitry to convert audio signals received from the user into voice communication signals, convert voice communication signals received from a wireless communication device into audio signals, some combination thereof, or the like. A headset device, in some embodiments, can include noise filtering circuitry which at least partially filters ambient noise 206 out of audio signals received at the microphone device 216, thereby distinguishing audio signals generated by the supported user from ambient noise.

In some embodiments, voice communication between separate users via a point-to-point wireless ad hoc network link between separate devices, each supporting a separate one of the separate users, enables communication between the users with minimally perceptible discontinuity between direct observation of user body gestures and communication of corresponding user-generated audio signals. For example, where user 220 generates audio signals which are converted by one or more of device 222, 224 to voice communication signals, communicated to device 212 via link 230, and provided to user 210 as audio signals via speaker device 215, user 220 may execute various body gestures which correspond to generation of the audio signals. Such gestures can include mouth movements, eye movements, facial muscle movements, limb movements, etc. As noted above, the latency associated with link 230 can be sufficiently low (e.g., <20 milliseconds) that the audio signal provided to user 210 via speaker device 215 is provided at approximately the same time as user 220 is observed by user 210 to execute the body gestures corresponding to the provided audio signal, such that a time discontinuity between the user 210 observing the execution of the body gestures and the user 210 receiving the corresponding audio signals via speaker 215 is imperceptible by user 210. In addition, the audio signal provided to user 210 via speaker device 215 is so provided at approximately the same time as audio signals generated by the user 220 are directly received 208 by user 210, such that a time discontinuity between the user 210 receiving the directly-communicated audio signals 208 and the user 210 receiving the audio signals communicated over link 230 via speaker 215 is imperceptible by user 210.

Figure 3:
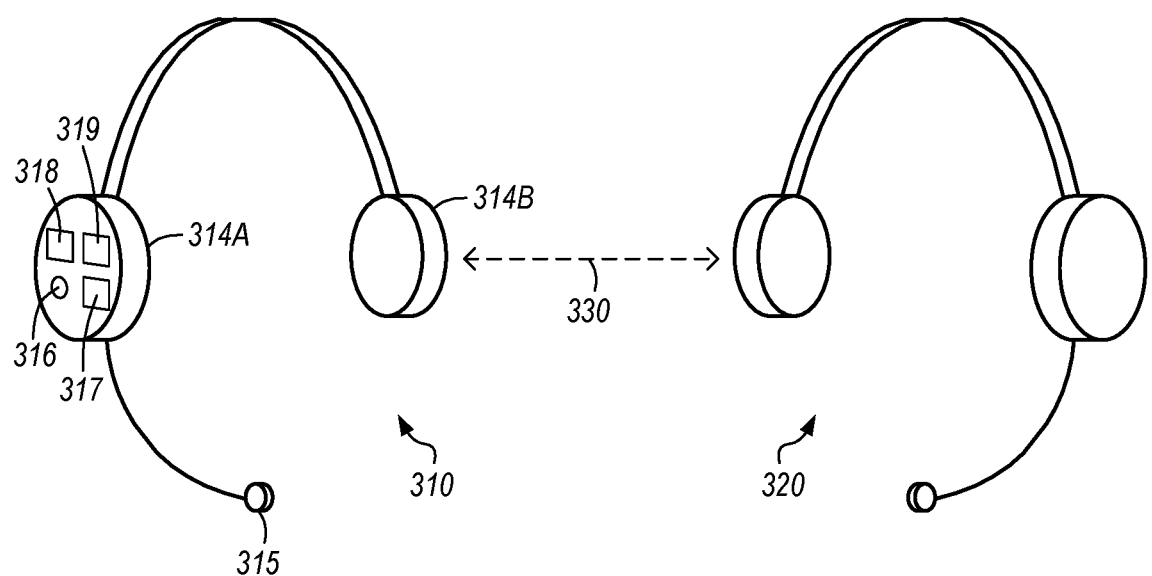
FIG. 3 illustrates wireless communication devices which each include one or more wireless communication headset devices and communicate via a point-to-point wireless ad hoc network link between separate wireless communication headset devices.

FIG. 3 illustrates wireless communication devices 310, 320 which each include one or more wireless communication headset devices and communicate via a point-to-point wireless ad hoc network link between separate wireless communication headset devices. One or more of devices can be included in any of the above embodiments of wireless communication devices described herein.

In some embodiments, a wireless communication device configured to enable voice communication between a supported user and one or more other users of one or more other remote devices, via a point-to-point wireless ad hoc network connection between the wireless communication device and the one or more other remote devices, includes one or more wireless headset devices. Such one or more wireless headset devices can include one or more modules, user interfaces, etc. For example, in the illustrated embodiment, each wireless communication device 310, 320 is a wireless headset device which includes a respective microphone device 315, speaker devices 314A-B, structure 313, user interface button 316, and one or more modules 317, 318, 319. Such modules, which can include an audio interface module 317, wireless transceiver module 319, and voice communication module 318 can be similar to modules 217-219 illustrated and described above with reference to FIG. 2. A headset device can include various combinations of the above modules, interfaces, structures, etc. For example, some wireless headset devices include a single speaker device 314A and lack at least structure 313 and speaker device 314B.

In some embodiments, a wireless headset device is configured to exchange voice communication signals with a selected remote device via a point-to-point wireless ad hoc network link, based at least in part upon a user interaction with the wireless headset device. Such user interaction can include interaction with one or more various user interfaces of the headset device which can include generation of various user commands. For example, device 310 includes a button interface 316 which, when pressed by a user, can result in a user command to transceiver module 319 to search for one or more remote devices 320 which are "in range" of device 310 and a user command to module 318 to interact with the audio interface module 317 to provide to a user, via one or more of speaker devices 314A-B, audio signals indicating whether one or more remote devices are in range of device 310, and if so, indicate one or more particular remote devices. Module 318 can, based at least in part upon user interaction with one or more of interface 316, microphone device 315, etc., select a particular detected remote device and establish a point-to-point wireless ad hoc network link with the selected remote device, and initiate an exchange of voice communication signals with said selected remote device via said link. Such interactions can include, for example, a user interacting with button 316 subsequently to an indication of a particular remote device being provided via one or more of devices 314A-B, a user providing an audio command via microphone device 315 subsequently to an indication of a particular remote device being provided via one or more of devices 314A-B, some combination thereof, etc.

In some embodiments, audio indications of remote devices are provided via a limited selection of audio interfaces (e.g., speaker device 314A and not speaker device 314B) and can indicate a remote device based on user information associated with one or more users supported by the remote device, user information associated with one or more users associated with the remote device, some combination thereof, etc. For example, an audio signal indicating a particular remote device presently supporting a particular user can include an indication of the user name of the particular user.

Figure 4:
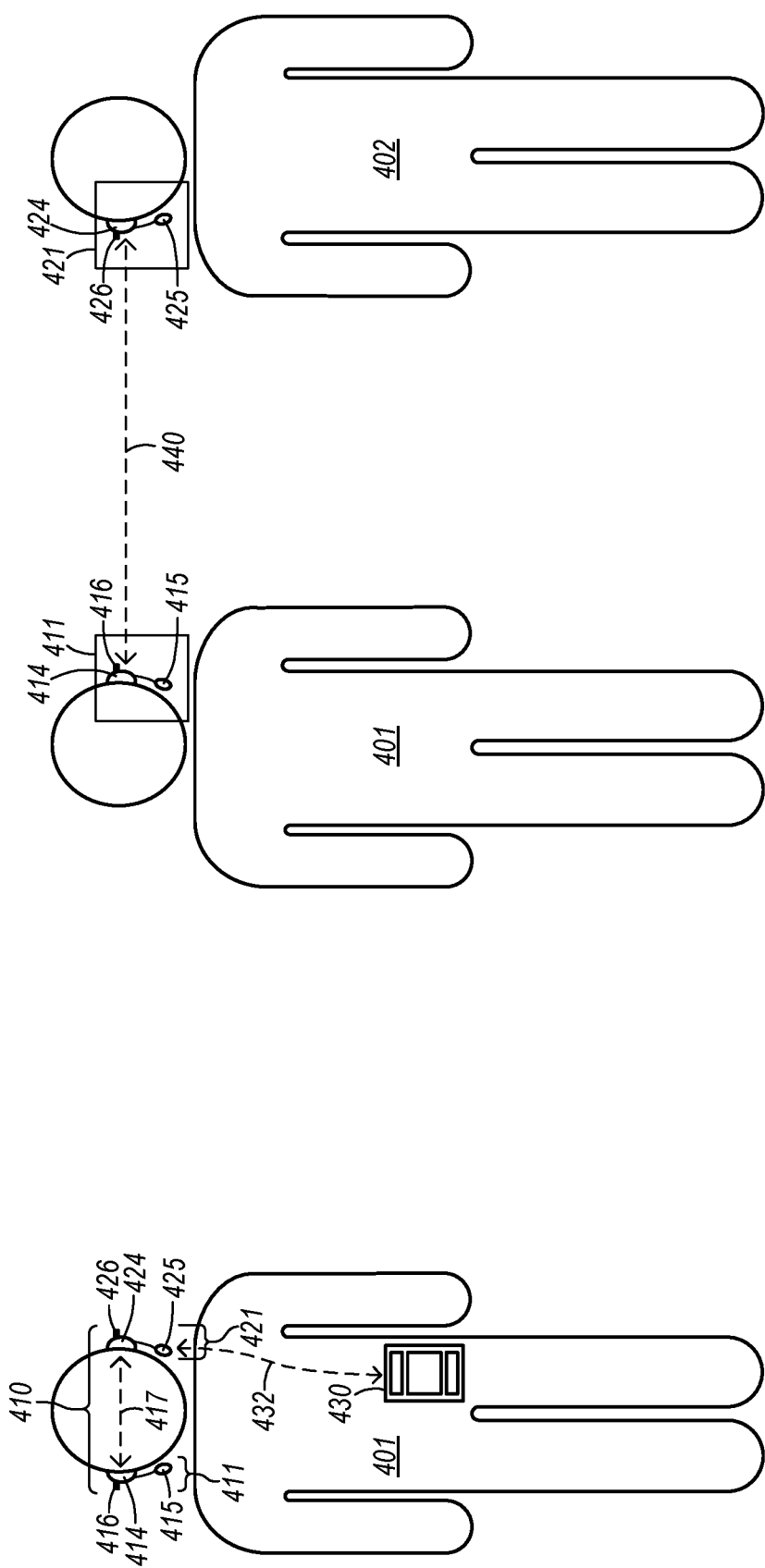
FIG. 4A-B illustrate a set of wireless communication headset devices which can be switched between collectively providing a stereo audio experience for a single supported user and individually supporting separate supported users and exchanging voice communication signals via a wireless ad hoc network link, according to some embodiments.

FIG. 4A-B illustrate a set of wireless communication headset devices which can be switched between collectively providing a stereo audio experience for a single supported user and individually supporting separate supported users and exchanging voice communication signals via a wireless ad hoc network link, according to some embodiments. One or more of devices can be included in any of the above embodiments of wireless communication devices described herein.

In some embodiments, a wireless communication device which is configured to enable voice communication between a supported user and at least one remote user via a point-to-point wireless ad hoc network link includes a pair of headset devices, where the pair of headset devices can both exchange voice communication signals with each other via a wireless ad hoc network link to collectively provide a stereo audio experience for a single supported user. The pair of headset devices can switch from collectively providing the stereo audio experience for the single user to individually supporting a separate supported user and exchanging voice communication signals between the separate supported users via the wireless ad hoc network link, based at least in part upon user interaction with one or more user interfaces included in one or more of the pair of headset devices.

FIG. 4A illustrates a pair 410 of headset devices 411, 421, where the devices can collectively provide audio signals to a single user 401, via respective speaker devices 414, 424 of the respective devices, which results in a stereo audio experience for the user 401. For example, each separate device 411, 421 can be mounted proximate to a separate ear of user 401.

Devices 411, 421 can provide audio signals, via respective speaker devices 414, 424, to user 401 based on signals received at one or more of the devices from an external source. The devices 411, 421 can communicate signals between each other via a wireless network link 417, which can include a wireless ad hoc network link between the separate devices 411, 421 of the pair 410. For example, as shown, device 421 can receive signals from a separate device 430 via a communication pathway 432, which can include a wireless network link, and at least a portion of the signals received at device 421 via pathway 432 can be communicated from device 421 to device 411 via link 417. The devices 411, 421 can collectively provide audio signals to the user 401, based on the signals received at device 421 via pathway 432, to provide a stereo audio experience to the user 401. As an example, device 430 can transmit electrical signals associated with an audio stream to device 411, 421 via one or more pathways 432, where the signals include data associated with a "right" audio channel and data associated with a "left" audio channel for a stereo audio experience. Device 421 can transmit the data associated with the "left" audio channel to device 411 via link 417, and devices 411, 421 can each convert a respective one of the left or right channels to audio signals and provide said converted audio signals to the user 401 via respective speaker devices 414, 424.

One or more of the separate devices 411, 421 can include one or more user interfaces in addition to one or more audio interfaces. For example, both devices 411, 421 include a respective microphone device 415, 425 and a button interface 416, 426.

In some embodiments, a pair of wireless headset devices are configured to be switched from collectively providing a stereo experience to a single user to supporting point-to-point voice communications between separate users via a point-to-point wireless ad hoc network link between the separate wireless headset devices. FIG. 4B illustrates the devices 411, 421 comprised in pair 410 of FIG. 4A, where the devices 411, 421 are switched from collectively supporting a single user 401 to each supporting a separate user 401, 402 and supporting voice communications between the separate users 401, 402 via one or more wireless ad hoc network links 440 between the separate devices 411, 421. The link 440 illustrated in FIG. 4B can include the link 417 illustrated in FIG. 4A; in some embodiments the link 440 is separate from link 417; for example link 417 can be a Bluetooth® link and link 440 can be a Wi-Fi Direct® link.

In some embodiments, a pair of headset devices 411, 421 in a pair 410 can be switched between collectively supporting audio signal provision to a single user (e.g., collectively providing a stereo experience) to supporting voice communication between separate users via a point-to-point wireless ad hoc network link based on user interaction with one or more user interfaces of one or more of the devices 411, 421. For example, one or more of the separate devices 411, 421, in some embodiments, can switch the devices between stereo support and voice communication support based on user interaction with one or more of the button interfaces 416, 426 of one or more of the devices. Such switching can include one or more of the devices increasing an amount of power provided to a wireless transceiver of the respective device, switching from stereo functionality to voice communication functionality, etc.

In some embodiments, such switching implemented in a device 411, 421 can include inhibiting communications with other devices which are separate from the other device 411, 421 of the pair. For example, while device 421 of pair 410 can communicate with external device 430 via pathway 432 in FIG. 4A, the devices 411, 421 may each deactivate communication with any external devices 430 other than the other one of the devices 411, 421 when the devices are switched to support voice communication between separate users. Such deactivation can augment power management, particularly if the switching involves boosting power consumption by wireless transceivers of the devices 411, 421. In some embodiments, devices 411, 421 communicate with each other via link 417, and can switch between communicating via link 417 and link 421, independently of communication by either of devices 411, 421 with any external devices other than devices 411, 421, including device 430.

In some embodiments, a pair of headset devices 411, 421 in a pair 410 can be switched between collectively supporting audio signal provision to a single user (e.g., collectively providing a stereo experience) to supporting voice communication between separate users via a point-to-point wireless ad hoc network link independently of external devices which are separate from the devices 411, 421. For example, in the illustrated embodiment of FIG. 4A-B, while one or more of devices 411, 421 may interact with external device 430 while devices 411, 421 collectively provide a stereo experience to user 401, the devices can be switched to each support voice communication between separate users via a point-to-point wireless ad hoc network link independently of any user interaction with device 430, any communication signals transmitted from device 430 to either of devices 411, 421, etc. Such switching can be based at least in part upon user interaction with one or more user interfaces included in one or more of the devices 411, 421.

For example, as shown in the illustrated embodiment, each device 411, 421 includes a respective user interface 416, 426, which can include one or more of a switch, button, etc. which is associated with switching the respective device between collectively supporting audio signal provision to a single user (e.g., collectively providing a stereo experience) to supporting voice communication between separate users via a point-to-point wireless ad hoc network link. Where a user interacts with a user interface on one of the devices, the respective device can switch between collectively supporting audio signal provision to a single user (e.g., collectively providing a stereo experience) to supporting voice communication between an individual user and another user supported by the other one of the devices via a point-to-point wireless ad hoc network link. The respective device can further, based on the user interaction with the user interface on the device, generate a command signal to the other one of the devices to also switch between collectively supporting audio signal provision to a single user (e.g., collectively providing a stereo experience) to supporting voice communication between separate users via a point-to-point wireless ad hoc network link, such that both devices are switched similarly.

One or more of collectively supporting audio signal provision to a single user or supporting voice communication between separate users via a point-to-point wireless ad hoc network link can be a default state of one or more of the devices. For example, both devices 411, 421 can be in a default state, shown in FIG. 4A, of collectively supporting audio signal provision to a single user, and a user can interact with user interface 416 on device 411 where a wireless communication device included in device 411 responds to the user interaction with interface 416 by switching the respective device between collectively operating with devices 421 to support audio signal provision to a single user to supporting voice communication between separate users via communication with device 421. Device 411 can further respond to the user interaction with interface 416 by generating a command signal which can be transmitted from device 411 to device 421 via link 417, where device 411 can switch between collectively operating with device 411 to support audio signal provision to a single user to supporting voice communication between separate users via communication with device 411. Such switching can include switching between providing a particular set of audio signals to the user based on a particular set of audio channels (e.g., left and right stereo signals) to providing another set of audio signals based on another set of audio channels (e.g., a non-stereo audio signal based on both left and right channels). Such switching can be reversible.

Figure 5:
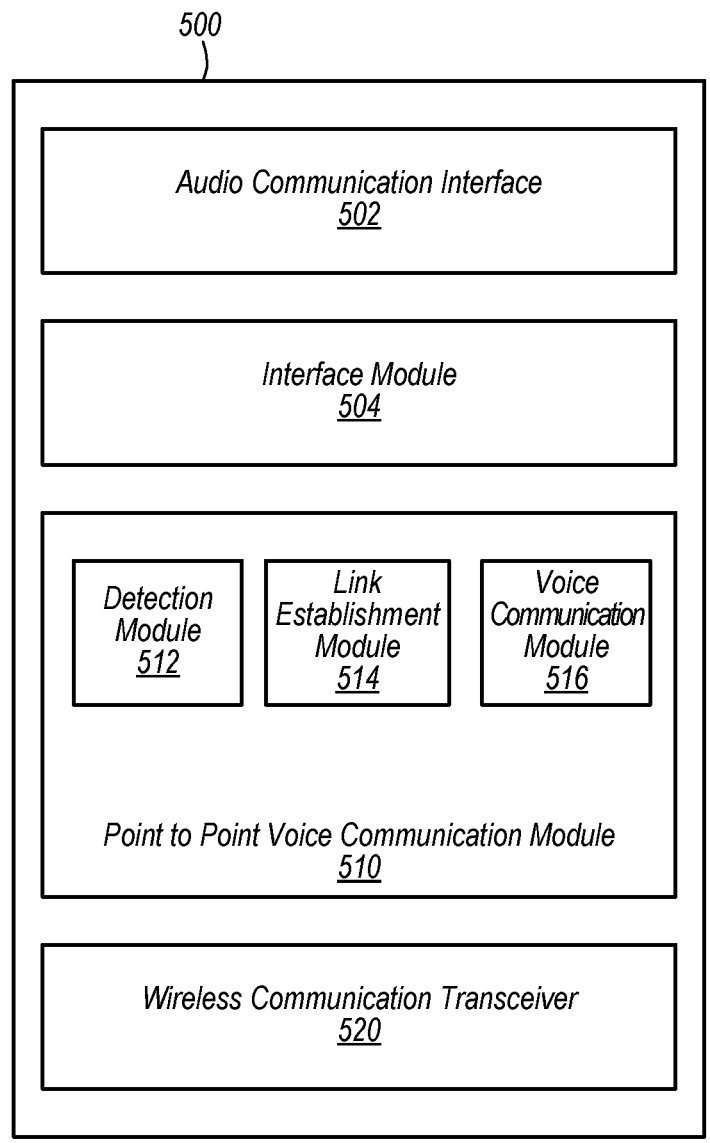
FIG. 5 illustrates a block diagram schematic of a wireless communication device configured to enable voice communication between a supported user and at least one remote user via a point-to-point wireless ad hoc network link, according to some embodiments.

FIG. 5 illustrates a block diagram schematic of a wireless communication device configured to enable voice communication between a supported user and at least one remote user via a point-to-point wireless ad hoc network link, according to some embodiments. The wireless communication device 500 illustrated in FIG. 5 can be included in any of the embodiments illustrated herein.

Wireless communication device 500, also referred to herein as "device 500", includes various modules 502-520. At least some of such modules can be interoperable to establish a point-to-point wireless ad hoc network link with a selected remote device, of the one or more remote devices, and communicate voice communication signals with the selected remote device via the link.

In some embodiments, device 500 includes an audio communication interface module 502 which communicates voice communication signals between an audio interface of the device and a wireless communication transceiver of the device 500. Module 502 can, in some embodiments, receive audio signals from an audio interface of the device and provide audio signals to an audio interface of the device. Module 502 can, in some embodiments, communicate signals with an external device, including a headset device, speaker device, microphone device, etc. via an interface of device 500, where such signals can include one or more of audio signals, electrical signals, some combination thereof, etc. In some embodiments, module 502 processes received signals to filter ambient sounds from said signals.

In some embodiments, device 500 includes a wireless communication transceiver 520 which can establish one or more point-to-point wireless ad hoc network links with one or more remote devices and communicate signals with same via the established links. Wireless transceiver 520 can include RF circuitry and can detect various remote devices configured to communicate via a wireless network via a wireless ad hoc network. In some embodiments, transceiver 520 can generate one or more wireless ad hoc networks, including one or more mobile ad hoc networks (MANETs), according to one or more various protocols, including Bluetooth®, Wi-Fi Direct®, etc.

In some embodiments, device 500 includes an interface module 504 which can support one or more user interfaces of the device 500. Such one or more user interfaces can include one or more display interfaces, one or more audio interfaces, one or more interfaces with one or more external devices which include one or more interfaces (e.g., a headset jack interface), some combination thereof, etc. It will be understood that user interfaces, as described herein, encompass any known connection interfaces, hardware interfaces, etc., including, without limitation, analog connection interfaces, phone connector interfaces, digital connection interfaces, USB interfaces, mini-USB interfaces, micro-USB interfaces, jack interfaces, I.E.E.E. 1394 interfaces, "Apple Lightning"® interfaces, "Thunderbolt"® interfaces, etc. Such support can include receiving one or more indications of one or more user interactions with one or more user interfaces of the device 500 and generating one or more user commands, based at least in part upon the one or more user interactions. Based on a particular user interaction with a user interface of the device, module 504 can generate a user command which can be executed by one or more modules of device 500. In some embodiments, such support can include providing, to a supported user via one or more user interfaces of device 500, an identification of at least some of the plurality of remote devices with which point-to-point wireless ad hoc voice communication can be established. Module 504 can, based at least in part upon module 520 detecting and identifying various particular remote devices which are "in range" of device 500, generate one or more indications of the various particular remote devices and present said indications to a supported user via one or more user interfaces of the device 500.

Where a user interface includes a display interface, module 504 can generate a graphical user interface (GUI) which presents, to a supported user via the display interface, one or more indications which comprise graphical representations of the various remote devices which are determined by module 520 to be "in range" of device 500. The GUI can include graphical representations positioned at various positions, relative to a graphical representation of device 500, relative to a physical range of wireless communication of device 500 via a wireless ad hoc network generated by transceiver 520, some combination thereof, etc. The graphical representations can include representations of users supported with the remote devices, associated with the remote devices, etc. The representations can be generated based on user information associated with said users received at transceiver 520, including user names associated with said users, images associated with said users, user information associated with said users, some combination thereof, etc. As a result, graphical representations of a remote device can include a graphical representation of a user supported by the remote device, associated with the remote device, some combination thereof, etc. One or more of the graphical representations can be associated with one or more user commands, so that module 504 can generate one or more user commands based at least in part upon determining that a user interaction has occurred with reference to a particular one or more graphical representations displayed via a GUI. Module 504 can present various indications of present wireless ad hoc network links between device 500 and one or more remote devices, and can present indications that a wireless ad hoc link is in the process of establishment, is terminated, etc.

In some embodiments, where a link request message requesting establishment of a wireless ad hoc network link with a remote device is received at device 500 from the remote device, module 504 can generate a link request message and present the message to the supported user via a GUI, where the message includes interactive elements which indicate user acceptance, denial, ignorance, etc. with regard to the request. The module 504 can generate one or more user commands to accept a link request, deny same, ignore same, etc. based on user interaction with one or more of the particular interactive elements included in a displayed link request message.

Where a user interface includes an audio interface, module 504 can generate audio signals which present, to a supported user via the audio interface, audio indications of the various remote devices which are determined by module 520 to be "in range" of device 500. The audio indications can include audio signals identifying various users supported with the remote devices, associated with the remote devices, etc. The identifications can include user information associated with said users received at transceiver 520, including user names associated with said users, user information associated with said users, some combination thereof, etc. As a result, an audio indication of a remote device can include an audio indication of a user supported by the remote device, associated with the remote device, some combination thereof, etc. In some embodiments, module 504 can generate one or more user commands based at least in part upon determining that a user interaction has occurred with reference to a particular one or more audio indications. For example, Module 504 can determine, based on receiving one or more particular audio signals from a user via one or more audio interfaces within a certain time period of presenting an audio indication of a particular remote device, based on receiving one or more particular audio signals determined to identify a particular remote device, etc., that a user interaction has identified the particular remote device. Module 504 can present one or more audio indications of an establishment of a wireless ad hoc network links between device 500 and one or more remote devices, and can present audio indications that a wireless ad hoc link is in the process of establishment, is terminated, etc.

In some embodiments, where a link request message requesting establishment of a wireless ad hoc network link with a remote device is received at device 500 from the remote device, module 504 can generate a link request message and present the message to the supported user via a GUI, where the message includes interactive elements which indicate user acceptance, denial, ignorance, etc. with regard to the request. The module 504 can generate one or more user commands to accept a link request, deny same, ignore same, etc. based on user interaction with one or more of the particular interactive elements included in a displayed link request message.

In some embodiments, device 500 includes a point-to-point voice communication module 510 which can establish a point-to-point wireless ad hoc network link with a selected remote device, of the one or more remote devices, and communicate voice communication signals with the selected remote device via the link, based at least in part upon a user interaction with the device which identifies a particular remote device as the selected remote device and commands establishing point-to-point wireless ad hoc voice communication with the selected remote device. Module 510 can be interoperable with the wireless communication transceiver and audio communication interface to implement the above.

In some embodiments, module 510 includes one or more modules 512-516. Module 510 can include a detection module 512 which, based at least in part upon the wireless transceiver 520, identify one or more remote devices which are "in range" of device 500. Such identification can include identification of one or more users associated with a given remote device, identification of one or more users presently supported by a given remote device, some combination thereof, or the like. Information indicating such identified remote devices, including information indicating the various associated users, supported users, etc., can be communicated to interface module 504, where such information can be used to generate indications presented to a user supported by device 500 via one or more user interfaces of the device 500.

In some embodiments, module 510 includes a link establishment module 514 which can identify one or more particular remote devices which are "in range" of device 500 as selected remote devices with which a wireless ad hoc network link is to be attempted to be established. Such identification can be based at least in part upon a user interaction with one or more user interfaces of the device 500, where the user interaction is determined to include a user-initiated identification of the one or more particular remote devices. Module 514 can, based at least in part upon selection of a particular remote device, initiate establishing of the wireless ad hoc network link with the selected remote device via transceiver 520. Such initiation can include generating a link request message which can be transmitted by transceiver 520 to the selected remote device, where the link request message can include a command to the remote device to establish the link. In some embodiments, the link request message can include a command to the remote device to request a supported user to accept, decline, ignore, etc. the link request.

In some embodiments, module 510 includes a voice communication module 516 which manages exchanges of voice communication signals between device 500 and a remote device via a point-to-point wireless ad hoc network link. Such managing can include receiving audio signals from interface 502, converting the signals to voice communication signals, commanding transceiver 520 to transmit said converted signals across a link, receiving voice communication signals from a remote device via transceiver, processing said received signals, providing said processing signals to interface 502 such that the processed signals are provided to a supported user via one or more audio interfaces, etc. Processing signals can include converting audio signals to voice communication signals, converting voice communication signals to audio signals, filtering ambient noise out of signals, some combination thereof, etc. In some embodiments, voice communication module 516 can terminate voice communication exchanges, command transceiver 520 to terminate an established link, etc. based at least in part upon a receipt of a termination command, where the termination command can be received at module 516 based at least in part upon user interaction with one or more user interfaces of device 500.

FIG. 6A-E illustrate graphical user interfaces (GUIs), displayed on one or more user interfaces of one or more devices, which enable user-imitated establishment of voice communication, via a wireless ad hoc network link, with one or more selected devices, according to some embodiments. The GUIs illustrated in FIG. 6A-E can be included in any display interfaces of any of the wireless communication devices described herein.

Figure 6A:
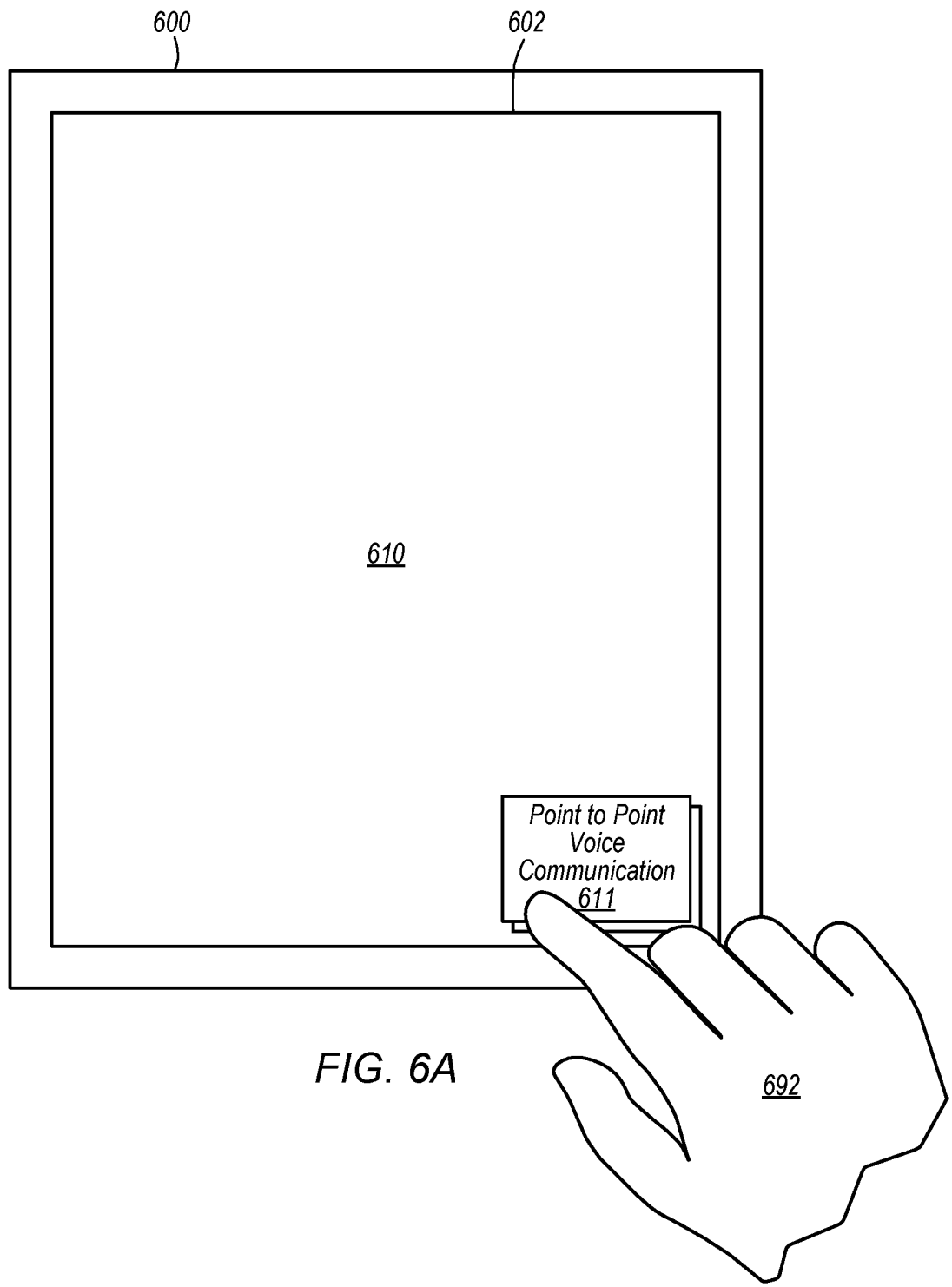
FIG. 6A-E illustrate graphical user interfaces, displayed on one or more user interfaces of one or more devices, which enable user-imitated establishment of voice communication, via a wireless ad hoc network link, with one or more selected devices, according to some embodiments.

FIG. 6A illustrates a wireless communication device 600 which includes a display user interface 602, hereinafter referred to as a display interface 602. A GUI 610 displayed in a display user interface 602 can include a general device GUI which includes various graphical representations of various elements of the device 600, including various applications, programs of instruction, etc. executable by device 600. In the illustrated embodiment, GUI 610 presents a graphical representation 611 of a point-to-point voice communication application. The graphical representation, which can also be referred to as an "icon" can include an interactive representation, where a user supported by device 600 can interact with the icon 611 to provide a command to at least some portion of device 600 to initialize the point-to-point voice communication application. Such interaction can include interaction with display interface 602, interaction with one or more other user interfaces of device 600, some combination thereof, etc. For example, where display interface 602 includes a touchscreen display, a user can touch 692 a portion of display 602 in which icon 611 is displayed to indicate a command to initialize the point-to-point voice communication application. Such initialization, which can be implemented by one or more portions of the device 600, can include searching for one or more remote devices which are "in range" of device 600.

Figure 6B:
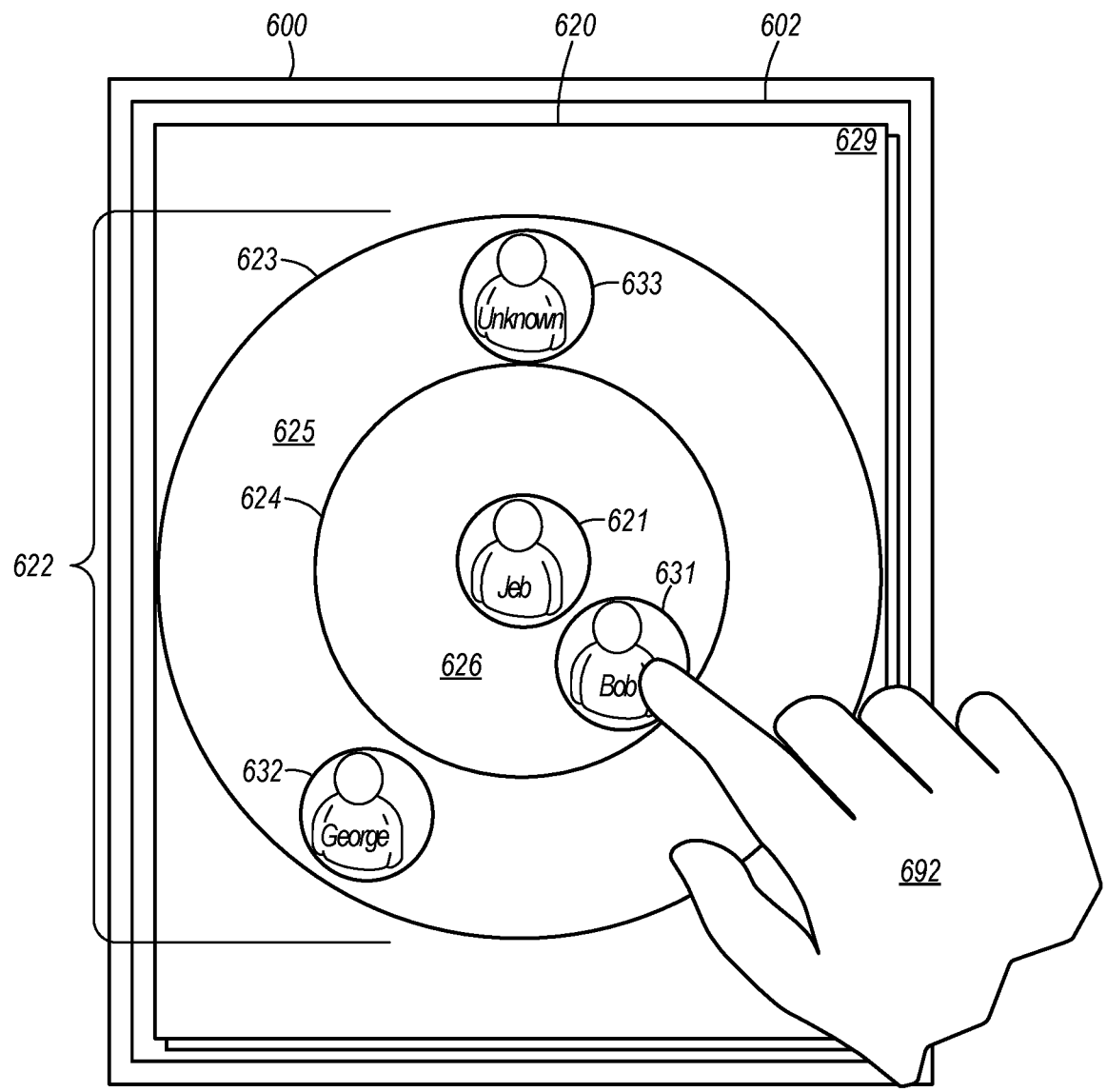

FIG. 6B illustrates a GUI 620 associated with the point-to-point voice communication application, which can be displayed in the display interface 602 of device 600 based on user interaction with the icon 611 illustrated in FIG. 6A. GUI 620 can be displayed on interface 602 based on initiation of a point-to-point voice communication application.

In some embodiments, GUI 620 can include one or more graphical representations 622 of the range, around a graphical representation 621 of device 600 and within a field 629 of GUI 620, of point-to-point wireless ad hoc network communication by device 600. Such range can include a physical range, which can vary based on one or more various environmental conditions. In some embodiments, the representations 622 can include an outer range 625, bounded by outer boundary 623, within which device 600 can detect a remote device via a wireless network and is precluded from engaging in voice communication via a point-to-point wireless ad hoc network link. In some embodiments, the representations can include an inner range 626, bounded by inner boundary 624, within which device 600 can engage in voice communication via a point-to-point wireless ad hoc network link.

In some embodiments, the GUI 620 includes one or more graphical representations of one or more wireless communication devices, including one or more of a graphical representation of device 600, a graphical representation of one or more remote devices, etc. Such graphical representations can include representations of one or more users associated with said devices, one or more users presently supported by said devices, some combination thereof, etc. In the illustrated embodiment, the representation 621 of device 600, also referred to herein as "icon 621", can be centered on the representations 622 of communication ranges and can include a representation of the user supported by device 600.

In some embodiments, a representation of a user can include one or more of an image associated with the user, a text label associated with the user, some combination thereof, etc. A text label associated with a user can include at least some user information associated with the user, including a user name. As shown, icons 621, 631, 632 of various wireless communication devices include an identification of a user supported by the respective device. Each icon 621, 631, 632 can include a separate image associated with the respective identified user. In some embodiments, where at least some user information associated with a remote device is absent, a graphical representation of the device can reflect such absence. For example, icon 633 indicates that at least some user information associated with the remote device represented by icon 633 is absent and therefore unknown.

In some embodiments, GUI 620 presents graphical representations of various remote devices as various positions within the GUI to indicate one or more of proximity of the represented remote devices to device 600, whether point-to-point ad hoc voice communications can be established with said remote devices at the present proximity from device 600, some combination thereof, etc. In the illustrated embodiment, for example, icon 631 is located within the "inner range" 625, indicating the voice communications can be established with the remote device associated with icon 631. In addition, icons 632, 633 are located within the "outer range" 625, which can indicate that the devices associated with icons 632, 633 are not sufficiently close in physical proximity to device 600 for device 600 to establish voice communications with users supported by one or more of said devices via a point-to-point wireless ad hoc network link. In some embodiments, any graphical representation 631, 632, 633 located within the outer boundary 623 is indicated to be "in range" of device 600 such that voice communication can be established between device 600 and the associated remote device via a wireless ad hoc network link.

In some embodiments, a graphical representation of a remote device is presented in GUI 620 based at least in part upon a determination, by one or more portions of device 600, regarding whether the remote device includes a point-to-point voice communication application. Where a remote device is "in range" of device 600 and lacks the application, a representation of the remote device may be absent from GUI 620.

In some embodiments, a position of a graphical representation in GUI 620 indicates a position of the associated remote device relative to a reference orientation of device 600. For example, in the illustrated embodiment, the icon 631 is positioned below and to the right of the icon 621 of the device 600, which can indicate that the remote device associated with icon 631 is behind and to the right of the reference orientation of device 600. A reference orientation can include, for example, an orientation towards geographic North, an orientation towards magnetic North, an orientation towards a direction of motion of device 600, an orientation towards a direction in which one or more external sides of device 600 is presently facing, some combination thereof, etc. In some embodiments, the position of an icon within a range is independent of the relative position of the associated device relative to a reference orientation of device 600.

Figure 6C:
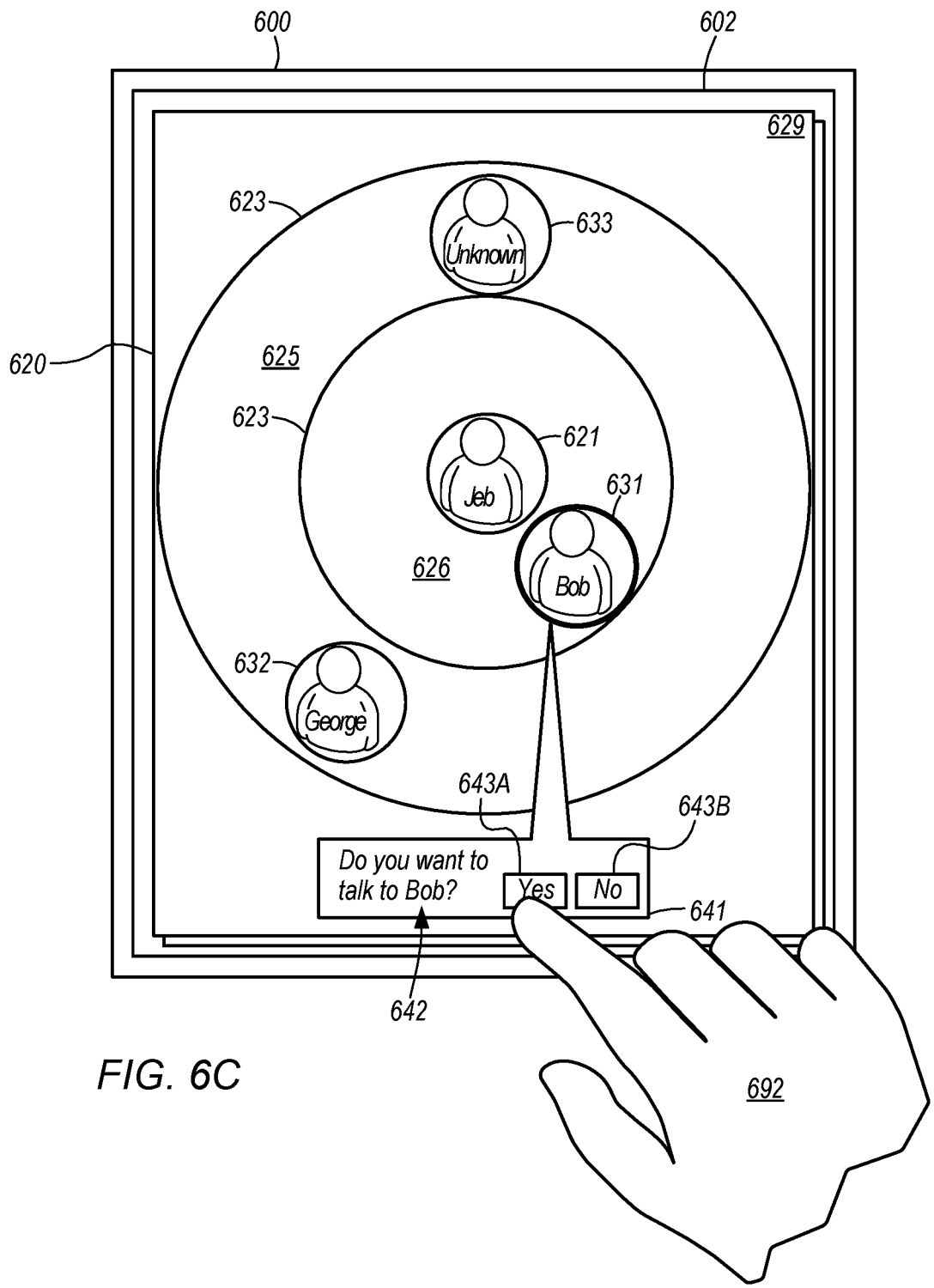

In some embodiments, one or more of the icons 631, 632, 633 of remote devices in GUI 620 are interactive, such that a user can interact with one or more such icons to provide a command to device 600 to establish voice communication with a user supported by the one or more remote devices represented by said icons via one or more point-to-point wireless ad hoc network links. For example, in the illustrated embodiment of FIG. 6B, a user can touch 692 a portion of display 602 in which a particular icon 631 is displayed to indicate a command to attempt point-to-point voice communication application with a particular remote device associated with the icon 631. FIG. 6C illustrates an embodiment of GUI 620 where, based on a user interaction with GUI 620, the remote device associated with icon 631 is determined to be selected and a confirmation message is displayed to receive confirmation of the selection via one or more user interactions. Selection of the device associated with icon 631 can be determined based at least in part upon a user interaction with icon 631. For example, where display 602 comprises a touchscreen, a user interaction with icon 631 can include touching 692 a portion of display 602 in which icon 631 is displayed. A user interaction with icon 631 can indicate a selection of a particular device associated with the icon 631.

As shown, in response to the user interaction with presentation 631, the icon 631 can be altered to indicate a selection of the device associated with icon 631 in response to the interaction, and a confirmation message 641 with regard to the selection can be displayed. The confirmation message 641 can include a query 642, to the supported user, requesting confirmation that the user desires establishment of voice communication with the remote device associated with icon 631. Such a query 642 can refer to the remote device with regards to one or more users associated with the remote device, presently supported by the remote device, etc. For example, where icon 631 includes a presentation of a particular user supported by the associated device, query 642 can include a request for confirmation that the supported user desire establishment of voice communication with the particular user supported by the associated device.

Confirmation message 641 can include one or more various interactive elements 643A-B with which a supported user of device 600 can interact to indicate confirmation or denial of a desire to establish voice communications with the associated device of icon 631.

In some embodiments, in response to selection of a particular remote device, one or more portions of a wireless communication device generates a link request signal which can be transmitted to the particular remote device via one or more communication networks, including a wireless ad hoc network. The link request signal, upon receipt at the remote device via one or more communication interfaces of same, can be processed by the remote device and cause the remote device to present a link request message to a supported user of the remote device. In some embodiments, where a remote device is "in range" of device 600 and lacks a point-to-point voice communication application, a representation of the remote device may be presented in GUI 620. Such a representation can include an indication that the associated remote device lacks the application, a user interaction with the representation of such a remote device can result in generation of a command to generate an invitation message which is transmitted to the remote device, where the invitation message can include an invitation to store a copy of the application at the remote device. The invitation message can include a copy of the application, a network link to a network location from which the application can be downloaded, some combination thereof, etc.

Figure 6D:
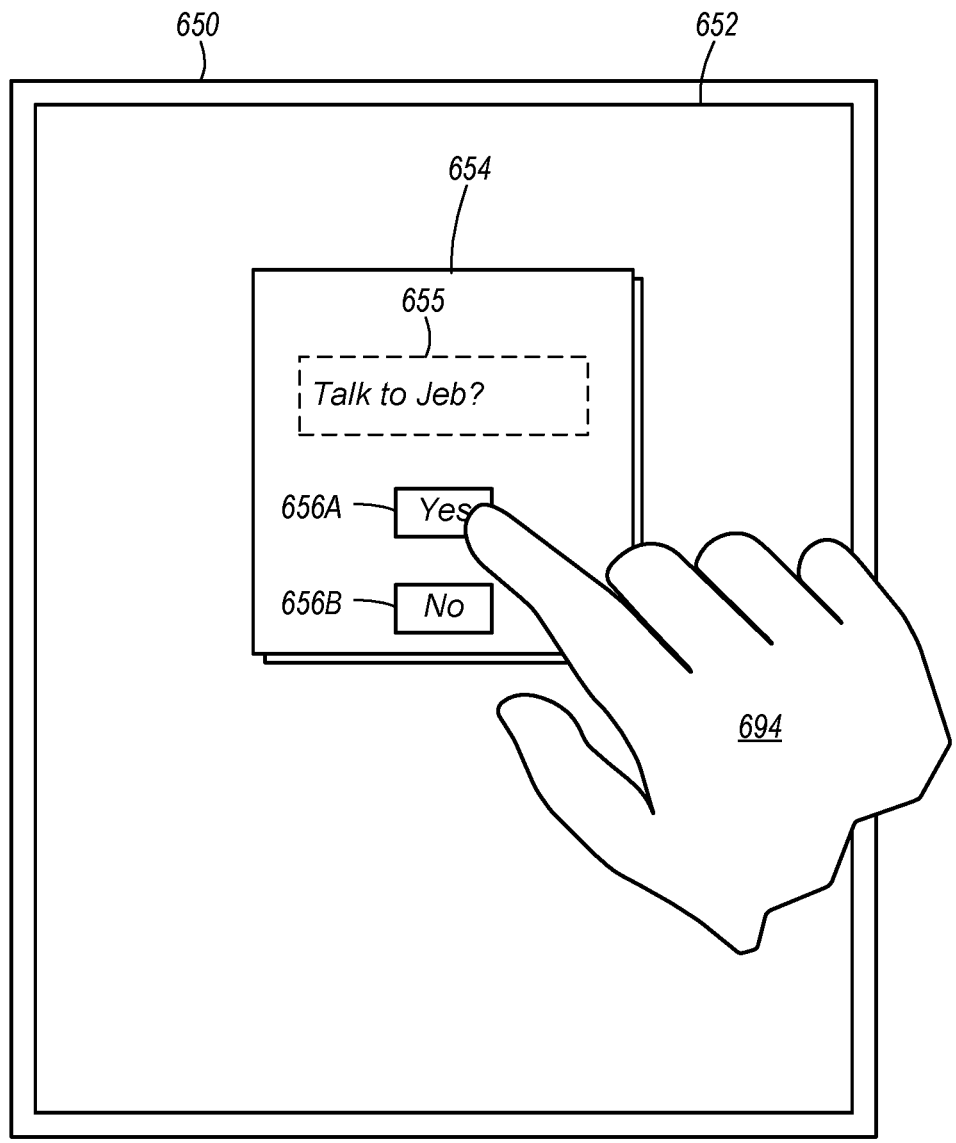

FIG. 6D illustrates a wireless communication device 650 which is remotely located from device 600 illustrated in FIG. 6A-C. Such a device 650 can be referred to herein as a "remote device 650" and can be the device associated with icon 631 illustrated above in FIG. 6B-C. The illustrated remote device 650 includes a display interface 652 and displays a GUI 654 associated with a point-to-point voice communication application. The GUI 654 can be displayed on interface 652 based at least in part upon receipt, at the device 650 of a link request signal from device 600 that is generated at device 600 based at least in part upon selection of device 652, where the selection can be based at least in part upon a user interaction with the icon 631 of the remote device 650 in the GUI 620 illustrated in FIG. 6B-C. The link request signal can include an identification of one or more elements associated with device 600 and can include a command to establish a wireless ad hoc network link with device 600. In some embodiments, the link request signals can include a command to device 650 to request confirmation of the link from a user supported by device 650.

In some embodiments, based on receipt of a link request signal, a remote device generates a link request message to a supported user. In some embodiments, the link request message identifies the device which generated the link request signal and request user confirmation of whether to accept the request to establish a wireless ad hoc network link with the device which generated the signal. Such a message can be included in a GUI which includes one or more interactive elements with which a supported user can interact to indicate one or more user commands responding to the request.

In the illustrated embodiment, GUI 654 includes a query message 655 identifying device 600 can requesting a supported user to indicate whether to establish point-to-point voice communication with device 600 via a wireless ad hoc network link. In some embodiments, a device is identified based at least in part upon one or more users associated with the device, one or more users presently supported by the device, some combination thereof, etc. In the illustrated embodiment, for example, message 655 identifies 600 by the user name of a user supported by device 600.

In some embodiments, GUI 654 is displayed on interface 652 in response to receipt of the link request signal at device 652 and without prompting by a supported user of device 652. In other words, the GUI 654 can be displayed automatically in response to receipt of the link request signal. Such a response to a link request signal can include initializing a point-to-point voice communication application on device 650 without prompting from a user supported by device 650.

As shown, GUI 654 includes interactive elements ("icons") 656A-B with which a supported user of device 650 can interact to indicate acceptance (656A) or denial (656B) of the link request signal. Based on a user interaction with an element indicating acceptance (656A), device 650 can generate an acceptance signal which can be transmitted to device 600. Based on a user interaction with an element indicating denial (656B), device 650 can generate a denial signal which can be transmitted to device 600. For example, in the illustrated embodiment of FIG. 6D, a user supported by the remote device 650 can touch 694 a portion of display 652 in which a particular icon 656A is displayed to indicate a command to accept point-to-point voice communication application with the particular remote device 600 from which the link request signal was received.

Figure 6E:
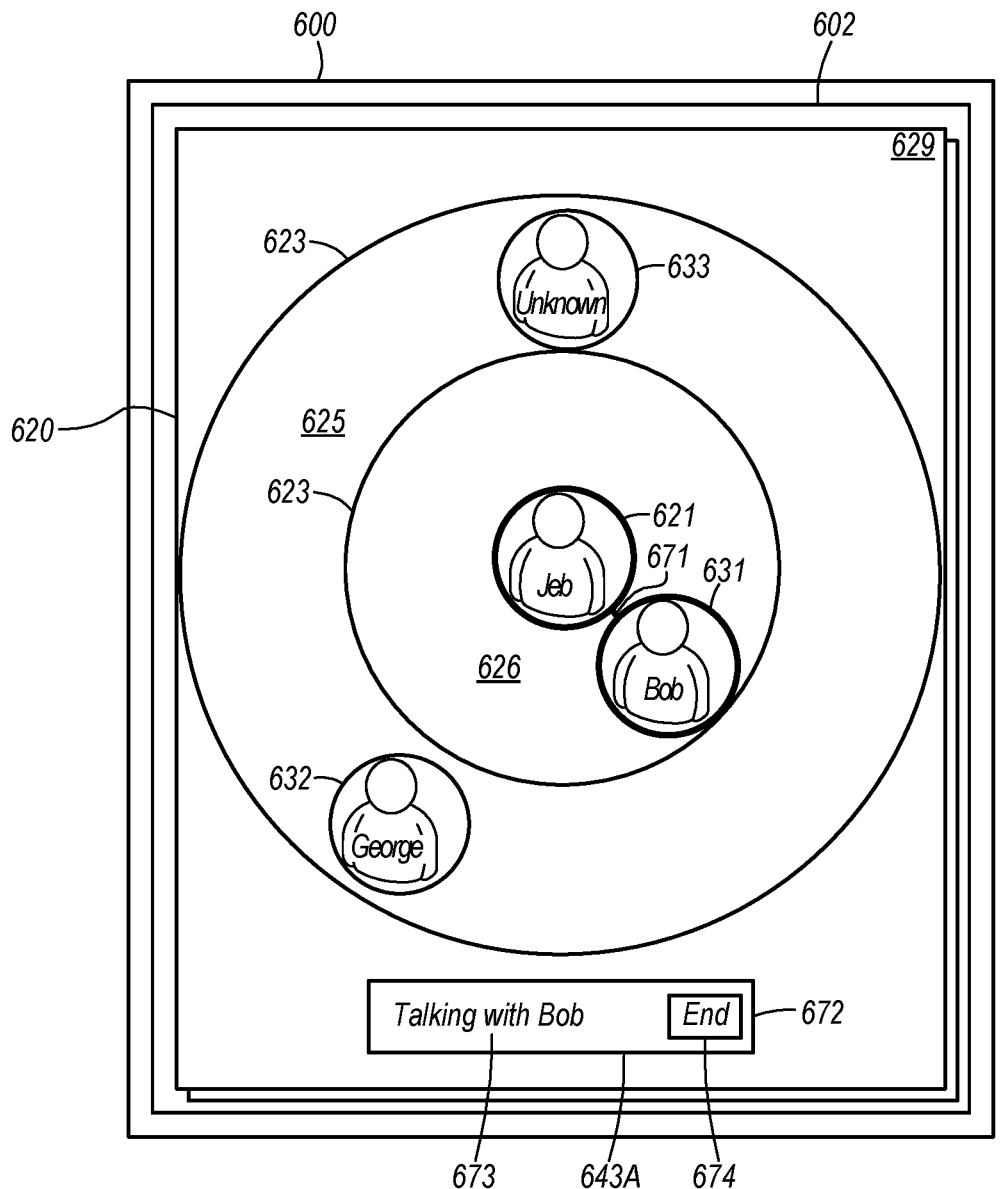

Upon receipt of a response signal from the remote device 650, device 600 can modify the GUI 620 displayed on interface 602 based on whether the link request is accepted, denied, ignored, etc. FIG. 6E illustrates a GUI 620 of device 600 where, in response to the link request signal generated at device 600 and transmitted to remote device 650, a response signal indicating acceptance of the request is received at device 600 from remote device 650. In response to receiving the acceptance, device 600 establishes one or more wireless ad hoc network links with the remote device 650 and initiates an exchange of voice communication signals with remote device 650 over the established one or more links.

In some embodiments, device 600 can present to the supported user of device 600, via GUI 620, one or more various indications of the established link with the remote device 650, one or me indications that voice communications are presently being exchanged with the remote device via the established one or more links, some combination thereof, etc. In the illustrated embodiment, GUI 620 includes highlighting of both the icon 621 of device 600 and the icon 631 of remote device 650 with which the wireless ad hoc network link is established. In addition, GUI 620 includes a representation 671 of the wireless ad hoc network link between device 600 and remote device 650. Such representation 671 can persist on GUI 620 for the duration of the presence of the established link. GUI 620 can include a message 672 which includes an indication 673 that voice communication (i.e., exchange of voice communication signals) between device 600 and remote device 650 is presently ongoing. In the illustrated embodiment, the message 672 identifies remote device 650 by identifying a user presently supported by the device 650.

In some embodiments, based at least in part upon point-to-point voice communications between established between a wireless communication device and a remote device via a wireless ad hoc network link, the wireless communication device can present, via a user interface, an interface element where, based on user interaction with the element, the device can terminate the wireless ad hoc network link. In the illustrated embodiment, for example, message 672 includes an interactive element (also referred to herein as an "icon") 674 with which a user can interact to provide a user command to terminate the established wireless ad hoc network link between device 600 and remote device 650.

Figure 6F:
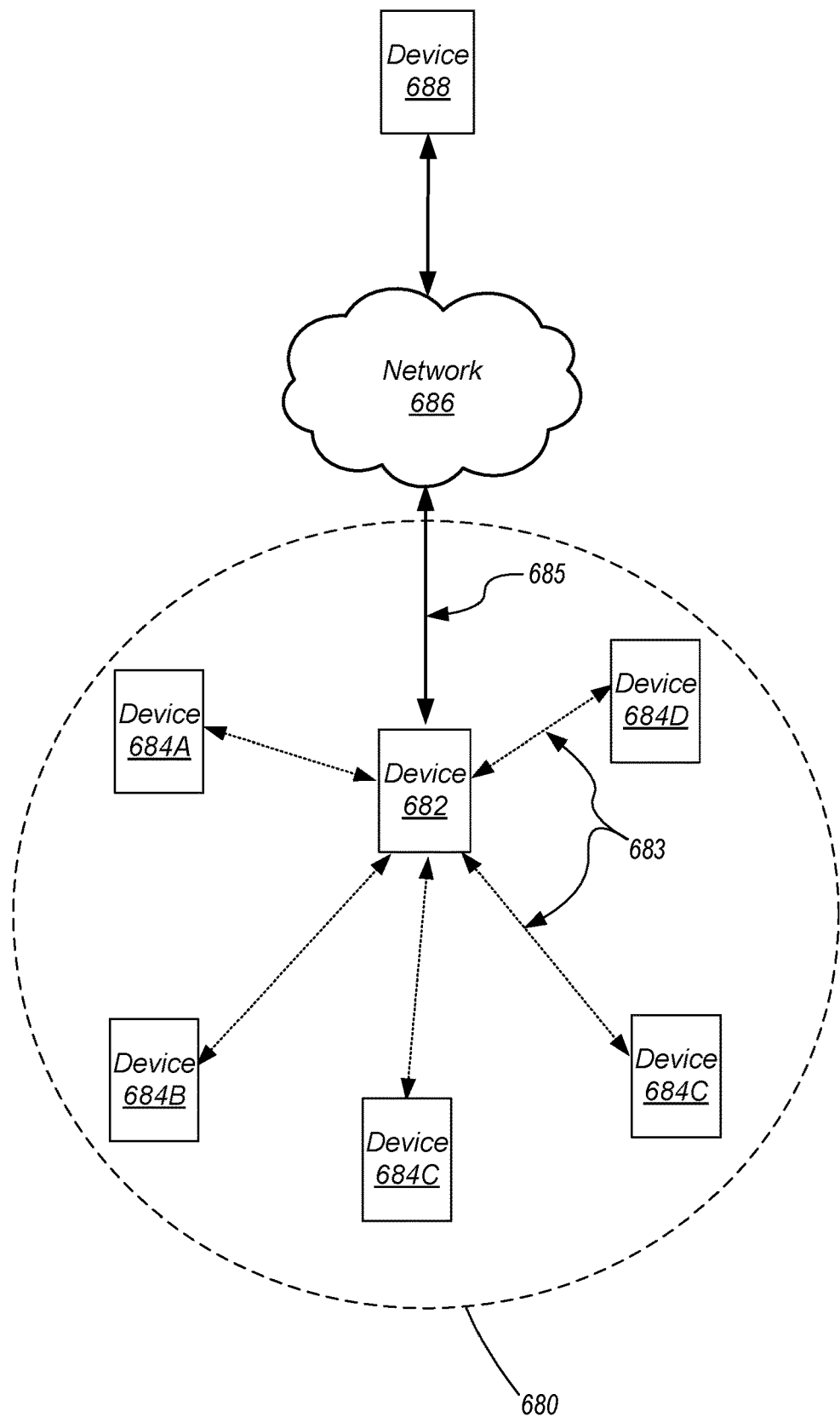
FIG. 6F illustrates wireless communication devices supporting separate users and enabling voice communication between the separate users and a remote device, via point-to-point wireless ad hoc network link between a primary wireless communication device and secondary wireless communication devices and a separate communication link between the primary wireless communication device and the remote device, according to some embodiments.

FIG. 6F illustrates wireless communication devices supporting separate users and enabling voice communication between the separate users and a remote device, via point-to-point wireless ad hoc network link between a primary wireless communication device and secondary wireless communication devices and a separate communication link between the primary wireless communication device and the remote device, according to some embodiments. The wireless communication devices illustrated in FIG. 6F can include any of the above embodiments of wireless communication devices.

In some embodiments, one or more wireless communication devices at least partially supports voice communication between a set of wireless communication devices via one or more point to point ad hoc network links. Such a device, which can be referred to as a "primary" device, can establish point-to-point ad hoc network links with multiple separate other wireless communication devices, referred to herein as "secondary" devices, and enable voice communication between at least some of the primary and secondary devices via the links between the primary and secondary devices. As a result, separate secondary devices, each separately linked directly to the primary device via separate point-to-point ad hoc network links, can exchange voice communication signals with each other via the primary device. Such secondary devices can be referred to as being indirectly linked.

As shown in FIG. 6F, for example, wireless communication device 682 is linked to multiple separate wireless communication devices 684A-D in geographic region 680 via separate point-to-point ad hoc network links 683 between the device 682 and the separate devices 684A-D. As a result, device 682 is a primary device and devices 684A-D are secondary devices, where communication signal exchanges between secondary devices 684A-D are enabled via primary device 682. In some embodiments, primary device 682 manages signal exchanges between secondary devices 684A-E, such that at least some voice communication signals exchanges are at least partially inhibited between devices 684. For example, device 682 can manage communication signal exchanges involving device 684A, via the respective link 683 between device 682 and device 684A, so that device 684 receives voice communication signals transmitted from one or more of devices 682, 684B-D and is inhibited from transmitting voice communication signals to at least devices 684B-D. Device 682 can selectively manage communication signal exchanges, such that device 682 allows voice communication signals from device 684A to be received at device 684B and not devices 684C-D. Such management can include device 682 transmitting command signals to device 684A to inhibit voice communication signal transmission from device 684A to device 682 via link 683, device 682 selectively routing signals received from device 684A to one or more selected other devices 684B-D, etc.

In some embodiments, device 682 manages the communication session among at least some of devices 682, 684. For example, device 682 can initiate the communication session, which can include voice communication signal exchanges between at least two of the devices 682, 684, via selectively establishing point-to-point ad hoc network links 683 with each of the devices 684A-D. Such establishing may be similar to the establishing illustrated above in FIG. 6A-E. In some embodiments, device 682 can concurrently establish links 683 with multiple separate devices 684A-D. For example, device 682 can identify devices 684A-D as being within a certain geographic location 680, proximity to devices 682, etc. and can at least generate link queries for each of devices 684A-D based on such identifying.

In some embodiments, a wireless communication device enables a communication session between one or more local wireless communication devices and one or more remote devices via a point-to-point ad hoc network link with the local wireless communication device and another separate communication link with the remote device. The remote device may be located in a remote location, such that ad hoc network links with the remote devices are precluded. In some embodiments, the remote device can be communicated with via one or more particular communication links and is unable to communicate via point-to-point ad hoc network links. A primary device, which can include a wireless communication device which can establish and maintain both point-to-point ad hoc network links and at least one other separate communication link, can enable at least indirect communication between the remote device and the one or more local devices via the separate links between the primary device and the remote and local devices. The primary device can synchronize communications between one or more local devices, linked with the primary device via a point-to-point ad hoc network link, and one or more remote devices linked with the primary devices via another separate network link, so that the primary device, one or more local devices, and one or more remote devices can exchange communication signals in a "conference call" communication session.

In the illustrated embodiment of FIG. 6F, for example, remote device 688 can be located beyond region 680, such that device 688 is out of range of point-to-point ad hoc network communication with any of devices 682, 684. Remote devices 688 can be structured to communicate via one or more communication links which are separate from point-to-point ad hoc network links; such a device may be located within the region 680 which can include the physical range in which device 682 can establish point-to-point ad hoc network links but unable to communicate via such links 683.

In the illustrated embodiment of FIG. 6F, device 682 is communicatively linked with remote device 688 via network link 685 over network 686. Such a network link 685 will be understood to encompass known communication links which are separate from point-to-point ad hoc network links, including telephonic communication links, LAN network links, cellular network links, satellite communication links, etc. The link 685 can be established via one or more of devices 682, 688. As shown, device 682 is linked with devices 684A-D via point-to-point ad hoc network links 683. As a result, devices 684A-D are communicatively linked with remote devices 688 via device 682. Thus, voice communication signal exchanges between devices 684A-D and device 688 can be managed by device 682. Device 682 can include processing circuitry which converts signals exchanged over link 685 to a state in which the signals can be exchanged over one or more links 683, and vice versa. In some embodiments, device 682 establishes one or more links 683 based on a signal received from device 688 over link 685. For example, device 682 can, based on a command signal received from device 688 via link 686, generate link queries for transmission to one or more of devices 684 to establish links 683.

In some embodiments, device 682 manages communication signal exchanges between devices 688 and 684A-D. For example, device 682 can route incoming signals from device 688 over link 685 to all of devices 684 via the separate links 683, so that users supported by the separate devices 684 can each receive audio signals from device 688, and device 682 can inhibit voice signals from being communicated from one or more devices 684A-D to one or more other devices 682, 684, 688. As a result, where devices 682, 684, 688 are engaged in a "conference call" communication session via links 683, 685, device 682 can cause selected devices 684, such as device 684A, to participate in a listening-only mode while other selected devices, such as devices 688, 682, 684B-D, can send and receive voice communication signals to each other. In some embodiments, communication settings are established by default based on the type of link via which device 682 is linked to the respective devices. For example, devices 684 linked to device 682 via point-to-point ad hoc network links during a conference call session with a remote device 688 over another link 686 may be restricted to communicating with other devices 682, 684, so that devices located within the common region 680 are enabled to communicate with each other via point-to-point ad hoc network links and communication over link 685 is restricted to signals generated at devices 682, 688.

Figure 7:
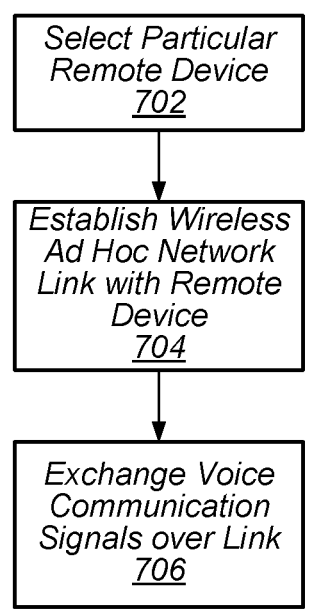
FIG. 7 illustrates a process for establishing voice communication with a selected remote device via a wireless ad hoc network link, according to some embodiments.

FIG. 7 illustrates a process for establishing voice communication with a selected remote device via a wireless ad hoc network link, according to some embodiments. The process 700 can be implemented by one or more computer systems, including one or more elements of a wireless communication device in any of the above embodiments. For example, the process 700 can be implemented by one or more point-to-point voice communication modules included in one or more wireless communication devices to establish a point-to-point wireless ad hoc network link with one or more other devices and communicate voice communication signals with the one or more other devices via the link.

At 702, a selection is made of one or more particular remote devices within a sufficiently close proximity that a wireless ad hoc network connection can be established with the one or more remote devices. Such a "sufficiently close" proximity can be based on the capabilities of a wireless communication transceiver; the proximity which is "sufficiently close" can vary based at least in part upon the external environment, including the presence of various structures, materials, etc. Multiple remote devices can be within sufficiently close proximity, and a selection can be made of a particular remote device from the multiple devices. The particular remote device is selected as a "selected" remote device with which a wireless ad hoc network link will be attempted to be established, such that voice communication signals can be exchanged with the selected remote device over the wireless ad hoc network link.

Selection of one or more particular remote devices can be based at least in part upon a user interaction with one or more wireless communication devices, including a device executing the process 700. Such user interaction can include user interaction with one or more user interfaces of the device, including user interaction with a button, switch, etc.

In some embodiments, a user interface of the device includes a display interface, including a touchscreen, which can present, to the user, a graphical user interface associated with a wireless ad hoc voice communication application which includes various interactive elements (e.g., icons, graphical representations, etc.) with which the user can interact, via interaction with the display interface, to indicate a selection of one or more particular remote devices. For example, where a display interface includes graphical representations of remote devices which are in sufficiently close proximity to the device that the device can establish wireless ad hoc network links with one or more of the devices, the user can interact, via touching a portion of the display interface on which the representation is displayed, interacting with a cursor interface, etc. with the graphical representation of a particular remote device to indicate selection of the particular remote device. In some embodiments, the graphical representation of a remote device on a graphical user interface includes an indication of one or more particular users supported by the remote device. For example, the graphical representation can include an image associated with the supported user, a name associated with the supported user, etc. The user interaction which indicates a particular remote device can result in generation of a user command signal which commands selection of the particular remote device.

In some embodiments, a user interface of the device includes an audio interface, including a speaker, microphone, etc. which presents audio signals indicating one or more various remote devices which are in sufficiently close proximity to the device that the device can establish wireless ad hoc network links with one or more of the devices. Such audio signals can include audio recitations of user names of users supported by, associated with, etc. the various remote devices. The user can interact with the audio interface, one or more other user interfaces, etc. to indicate selection of a particular one of the remote devices. Such interaction can include the user providing a voice command to a portion of the audio interface, including a microphone, commanding selection of a particular device, a device associated with a particular user, etc. The user interaction which indicates a particular remote device can result in generation of a user command signal which commands selection of the particular remote device.

At 704, a wireless ad hoc network link is established with the selected remote device. Establishing the link can include transmitting a link request signal to the selected remote device and receiving a link acceptance signal from the selected remote device. The link request signal, also referred to herein as a "query", can include a signal that, when received at the selected remote device, causes the remote device to present a query message to a user supported by the selected remote device, via one or more user interfaces of the remote device. As discussed further herein, where the one or more user interfaces includes a display interface, including a touchscreen, the query message can be presented as a graphical message on a graphical user interface associated with a wireless ad hoc voice communication application of the selected remote device. The graphical message can include a message to the user requesting the user to provide instructions regarding whether to accept, decline, ignore, etc. the link request signal. The graphical message can include one or more interactive elements (e.g., icons, graphical representations, etc.) which are associated with various separate user commands, and the user can be invited, in the graphical message, to interact with one or more of the interactive elements to indicate whether the user desires to accept the link request, decline same, ignore same, etc.

Upon user indication of accepting the link request, the selected remote device can generate an acceptance signal. Upon receipt of the acceptance signal, a device which generated the link request signal can establish the wireless ad hoc network link with the selected remote device At 706, one or more voice communication signals are exchanged with the selected remote device via the wireless ad hoc network link. Voice communication signals can include electronic signals, including digital signals, from which audio signals received at an audio interface associated with a device are converted. In some embodiments, voice communication signals are received at an audio interface as electronic signals, as the audio signals can be converted to electric signals at an external audio interface device, including a headset device, microphone device, etc. which is coupled to the device which enhances voice communication signals with the selected remote device over the wireless ad hoc network link.

Voice communication signals received at a device via an audio interface can transmit such voice communication signals to the selected remote device over the wireless ad hoc network link, and voice communication signals received at the device from the selected remote device over the wireless ad hoc network link can be converted to audio signals and provided to a user supported by the device via one or more audio interfaces.

The voice communication signal exchange, and the wireless ad hoc network link, can be terminated in response to a termination command signal, where the termination command signals can be received at a device based on a user interaction with the device via one or more user interfaces, received at the device from the selected remote device via the wireless ad hoc network link based on user interaction with a user interface of the remote device, etc.

Figure 8:
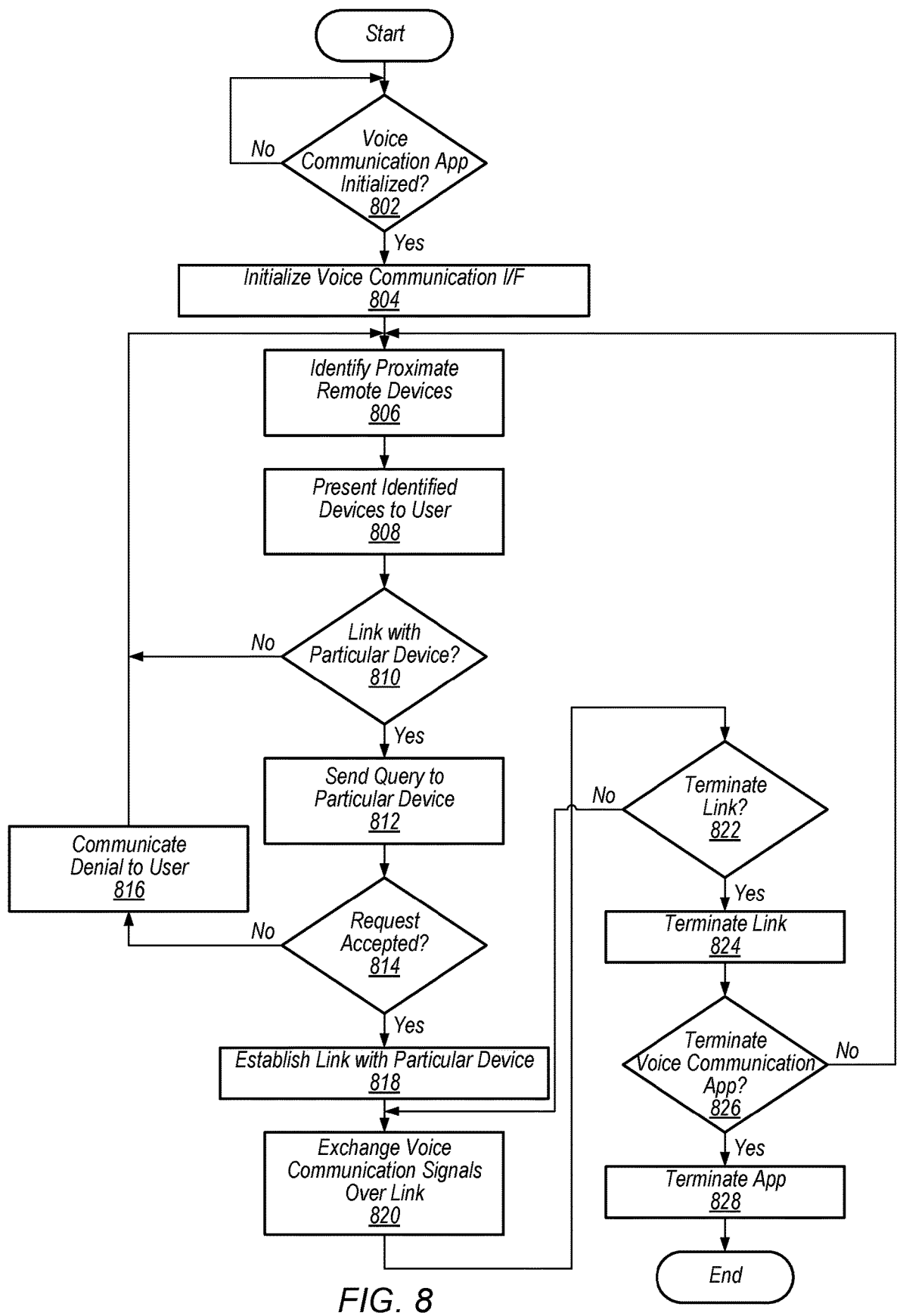
FIG. 8 illustrates a process for exchanging voice communication signals with a selected remote device via a wireless ad hoc network link, according to some embodiments.

FIG. 8 illustrates a process for exchanging voice communication signals with a selected remote device via a wireless ad hoc network link, according to some embodiments. The process 800 can be implemented by one or more computer systems, including one or more elements of a wireless communication device in any of the above embodiments. For example, the process 800 can be implemented by one or more point-to-point voice communication modules included in one or more wireless communication devices to establish a point-to-point wireless ad hoc network link with one or more other devices and communicate voice communication signals with the one or more other devices via the link.

At 802, a determination is made regarding whether a point-to-point voice communication application is initialized at a wireless communication device. Such a determination can be made at one or more portions of the wireless communication device. Such initialization can be determined based at least in part upon user interaction with one or more user interfaces of the wireless communication device. For example, where a device includes a user interface which itself is a display interface (e.g., a touchscreen), initialization of the point-to-point voice communication application can be determined based at least in part upon a determination that a user interaction has occurred with regard to an interactive element (e.g., an icon, graphical representation, etc.) included in a graphical user interface, where the interactive element is associated with the point-to-point voice communication application.

If, at 802 and 804, the determination is made that the point-to-point voice communication application is initialized at a wireless communication device, a user interface associated with point-to-point wireless ad hoc voice communication can be presented to a user via one or more user interfaces of the wireless communication device. The one or more user interfaces can be the same user interfaces via which initiation of the point-to-point voice communication application is determined, different user interfaces, some combination thereof, or the like. A point-to-point voice communication application can be implemented, initialized, terminated, etc. by one or more portions of one or more computer systems, including some part of the modules illustrated in FIG. 5. For example, in some embodiments, module 510 can implement the application, which can include commanding module 504 to present a GUI on a display interface, commanding transceiver 520 to detect proximate remote devices which also include a point-to-point voice communication application, command module 504 to present information associated with the detected proximate remote devices via graphical representations included in the GUI, etc.

Presenting a user interface can include presenting a graphical user interface on a display interface of the wireless communication device. A graphical user interface (GUI) can present one or more of representations of a proximity within which the device can establish wireless ad hoc network links, also referred to as the ad hoc network "range" of the device. A GUI can present one or more graphical representations of one or more remote wireless communication devices within range of the wireless communication device presenting the GUI. Such graphical representations can be displayed at various locations on the display to indicate one or more of proximity and direction of the remote devices to the device presenting the GUI. Such graphical representations can include representations of one or more various users associated with, supported by, etc. the device, where such representations can include images associated with the users, user names associated with the users, etc.

Presenting a user interface can include presenting audio signals to a user supported by the device via an audio interface of the wireless communication device. Such audio signals can include audio indications of various remote wireless communication devices within range of the wireless communication device. Such audio signals can include audio indications of one or more various users supported by, associated with, etc. the one or more remote devices.

At 806, one or more various remote wireless communication devices, also referred to herein as "remote devices", which are within sufficiently close proximity to the wireless communication device such that the wireless communication device can establish wireless ad hoc network links with the respective devices are identified. Identifying remote devices which are in "sufficiently close proximity" to the wireless communication can be referred to as identifying remote devices which are "in range" of the wireless communication device. Such identification can include determining one or more aspects associated with a remote device, including user information of one or more users associated with the remote device, user information of one or more users presently being supported by the remote device, etc. Such user information can include image data, user name data, user identification data, etc. Identifying remote devices "in range" of a wireless communication device can be referred to as "detecting" same. Such identification can include identifying remote devices based on a determination that such remote devices are presently configured to execute the point-to-point voice communication application. Such determination can include a determination that program instructions executable by the remote devices to execute the point-to-point voice communication application are stored in one or more memory devices of the remote devices.

At 808, indications of the remote devices determined to be "in range" of a wireless communication device are presented to a user supported by the wireless communication device via one or more user interfaces of the wireless communication device. Such indications can include indications of one or more users associated with one or more of the remote devices, one or more users presently supported by the one or more remote devices, etc.

In some embodiments, such indications are presented as interactive elements of a user interface of the wireless communication device. For example, where a wireless communication device includes a display interface which presents a GUI associated with a point-to-point wireless ad hoc network application, graphical representations of the remote devices determined to be "in range" of the wireless communication device can be presented to a supported user via the GUI. Such graphical representations can be displayed at various locations on the GUI to indicate one or more of proximity and direction of the remote devices to the wireless communication device. Such graphical representations can include representations of one or more various users associated with, supported by, etc. the device, where such representations can include images associated with the users, user names associated with the users, etc. In another example, where a wireless communication device includes an audio interface, audio signals associated with the remote devices determined to be "in range" of the wireless communication device can be presented to a supported user via a speaker device associated with the audio interface. Such audio signals can include an audio message indicating a name of one or more various users associated with the remote device, supported by the remote device, etc., an audio message indicating one or more instances of user information associated with the remote device, etc.

At 810, a determination is made regarding whether to establish a point-to-point wireless ad hoc network link between the wireless communication device and one or more particular remote devices. Such a determination can be based at least in part upon determining whether one or more of the various remote devices which are "in range" of a wireless communication device have been "selected" for point-to-point wireless ad hoc voice communication with a user supported by the wireless communication device. Such a determination can be based at least in part upon user interactions with the wireless communication device, including user interactions with one or more user interfaces of the wireless communication device.

As discussed above, such user interactions can include user interaction with a graphical representation of a particular remote device on a GUI presented on a display interface of a wireless communication device, user interaction with an audio interface of the wireless communication device, including one or more audio commands provided by the user, identifying a particular remote device, commanding establishment of point-to-point wireless ad hoc voice communication with a user supported by the particular remote device, some combination thereof, or the like. Identifying a particular remote device can include identifying one or more users associated with the particular remote device, identifying one or more users presently supported by the particular remote device, etc.

At 812, based at least upon a determination that a point-to-point wireless ad hoc network link between a wireless communication device and one or more particular remote devices is commanded, one or more link request signals ("queries") are generated and transmitted to said particular remote devices. Such particular remote devices can be referred to as "selected" remote devices. Link request signals can generated at the wireless communication device and transmitted to selected remote devices from same via one or more communication networks, including one or more wireless ad hoc networks. Link request signals generated for transmission to a given selected remote device can include information specific to the selected remote device, including a query message which specifically identifies a user associated with the selected remote device, a greeting message which can be selected from multiple greeting messages based at least in part upon an identity of the user associated with the selected remote device, a greeting message which can be selected from multiple greeting messages based at least in part upon an identity of the user presently supported by the selected remote device, some combination thereof, etc.

At 814, a determination is made regarding whether an acceptance signal is received at a wireless communication device from one or more selected remote devices to which link request signals are transmitted. As shown at 816, if no acceptance signal is received from a given selected remote device within a certain period of elapsed time, if a denial message is received from the selected remote device, some combination thereof, etc., a denial message can be presented to a user supported by the wireless communication device via one or more user interfaces of the wireless communication device. The denial message can be presented as an audio message via an audio interface of the wireless communication device, a graphical message via a GUI, some combination thereof, etc.

At 818, in response to a determination that an acceptance signal is received at a wireless communication device from a selected remote device, a point-to-point wireless ad hoc network link is established between the wireless communication device and the selected remote device. As referred to herein, a "point-to-point" link can be referred to as a "peer-to-peer" link and refers to a link between two or more devices without any intermediary devices included in the link. Such a link can also be referred to as a "direct" link. The point-to-point wireless ad hoc network link, which can include a mobile ad hoc network (MANET) link, can be established via one or more various protocols, including Bluetooth®, Wi-Fi®, Wi-Fi Direct®, etc.

At 820, voice communication signals are exchanged between the wireless communication device and the selected remote device via the one or more point-to-point wireless ad hoc network links established between the devices. Such exchange can be two-way, such that each device in the link transmits voice communication signals to one or more other devices in the like; one-way, such that only one device transmits voice communication signals, etc.

At 822, a determination is made regarding whether a termination command which indicates that a particular point-to-point wireless ad hoc network link with a selected remote device is received at a wireless communication device. A termination command can be received based on user interaction with a device, including the selected remote device. In some embodiments, a termination command is generated based at least in part upon an absence of voice communication signals being received over the point-to-point wireless ad hoc network link within a certain period of elapsed time. If, as shown at 824, a determination is made that a termination command regarding a particular point-to-point wireless ad hoc network link is received, the particular link is terminated. In some embodiments, where multiple point-to-point wireless ad hoc network links are established between a wireless communication device and multiple remote devices, determination of receipt of a termination command with regard to one or more of the point-to-point wireless ad hoc network links can result in termination of the one or more point-to-point wireless ad hoc network links while a remainder of the point-to-point wireless ad hoc network links are maintained. In some embodiments, where multiple point-to-point wireless ad hoc network links are established between a wireless communication device and a single remote device, determination of receipt of a termination command with regard to a particular one of the point-to-point wireless ad hoc network links, including the point-to-point wireless ad hoc network link via which voice communication signals are exchanged, can result in termination of the particular link associated with the termination command, while a remainder of the links are maintained.

At 826, a determination is made regarding whether to terminate the point-to-point voice communication application implemented at a wireless communication device. Such a determination can be made with regard to user interaction with the wireless communication device, including a user interface of same. In some embodiments, such a determination can be made based on a determination of an absence of user interaction with one or more user interfaces, an absence of present point-to-point wireless ad hoc network links with the wireless communication device, some combination thereof, etc. If so, as shown at 828, the point-to-point voice communication application is terminated.

As referred to herein with regard to at least process 800, the "wireless communication device" referred to with regard to each of the elements 802-828 of process 800 can be the same wireless communication device throughout some or all of the elements, different wireless communication devices throughout some or all of the elements, some combination thereof, or the like. For example, each of elements 802-828 can be implemented by one or more components of a single wireless communication device. In another example, at least some of elements 802-828 are implemented by one or more components of a wireless communication device and at least some of elements 802-828 are implemented by one or more components of another wireless communication device.

Multifunction Device Examples

Embodiments of electronic devices in which embodiments of voice communication modules as described herein may be used, user interfaces for such devices, and associated processes for using such devices are described. As noted above, in some embodiments, a voice communication module is included in a wireless communication device. In some embodiments, the wireless communication device included in any of the above embodiments includes a portable communications device, such as a mobile telephone, that also contains other functions, such as PDA and/or music player functions. Other portable electronic devices, such as laptops, cell phones, headset devices, pad devices, tablet computers with touch-sensitive surfaces (e.g., touch screen displays and/or touch pads), wearable devices (e.g., a computer system incorporated into an article of clothing including hats, shoes, shirts, pants, etc.; a wristwatch-type device which can be worn on a forearm, upper arm, leg, etc. and can include a user interface which can include one or more touch-sensitive surfaces), some combination thereof, or the like may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera device.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: an ad hoc voice communication application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 9:
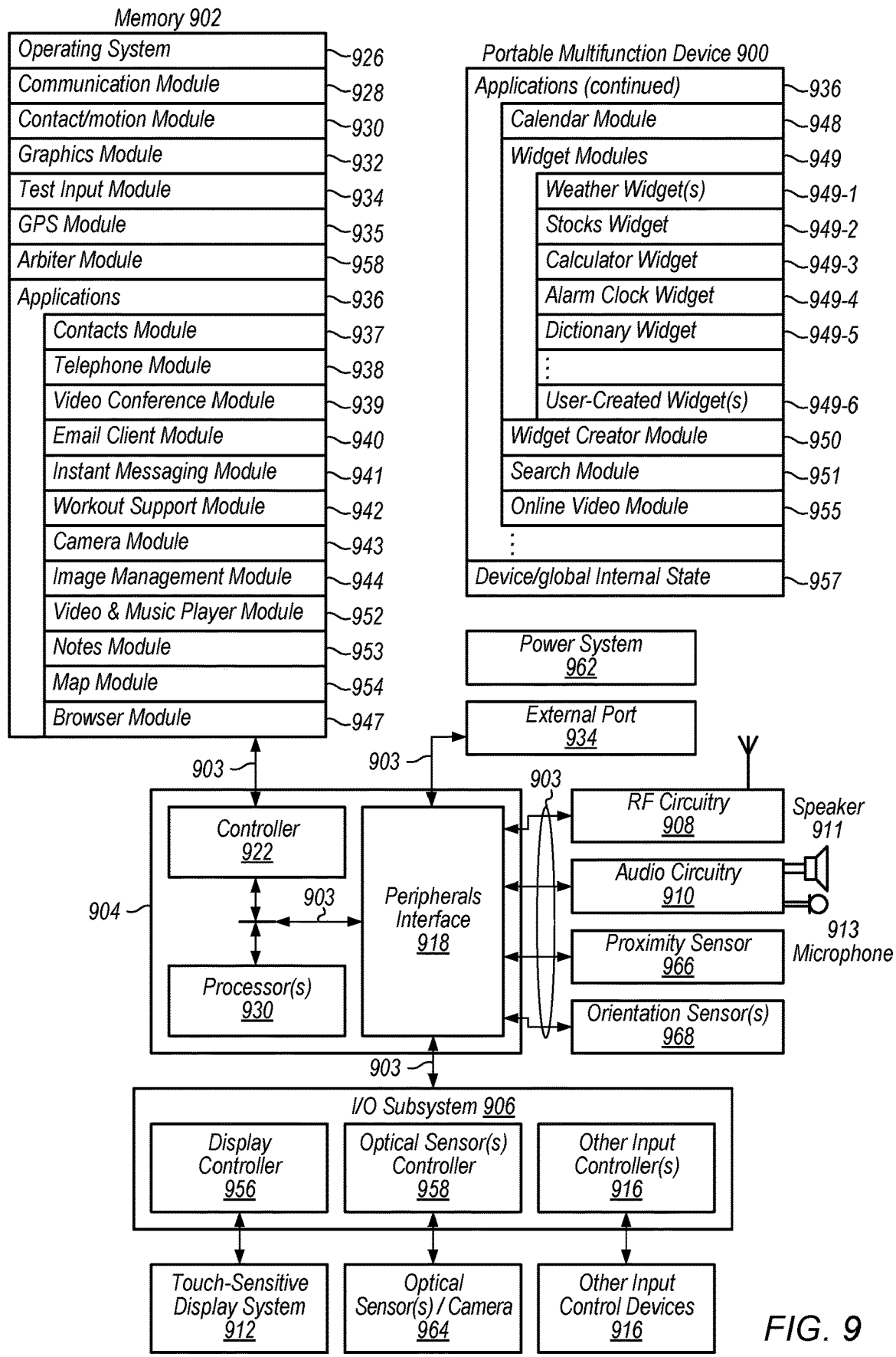
FIG. 9 is a block diagram illustrating portable multifunction device in accordance with some embodiments.

Attention is now directed toward embodiments of portable devices with cameras. FIG. 9 is a block diagram illustrating portable multifunction device 900 in accordance with some embodiments. Embodiments of a wireless communication device, as illustrated in at least FIG. 1-6, may be included in device 900.

Device 900 may include memory 902 (which may include one or more computer readable storage mediums), memory controller 922, one or more processing units (CPU's) 920, peripherals interface 918, RF circuitry 908, audio circuitry 910, speaker 911, touch-sensitive display system 912, microphone 913, input/output (I/O) subsystem 906, other input or control devices 916, and external port 924. Device 900 may include one or more optical sensors 964. These components may communicate over one or more communication buses or signal lines 903.

It should be appreciated that device 900 is only one example of a portable multifunction device, and that device 900 may have more or fewer components than shown, may combine two or more components, or may have a different configuration or arrangement of the components. The various components shown in FIG. 9 may be implemented in hardware, software, or a combination of hardware and software, including one or more signal processing and/or application specific integrated circuits.

Memory 902 may include high-speed random access memory and may also include non-volatile memory, such as one or more magnetic disk storage devices, flash memory devices, or other non-volatile solid-state memory devices. Access to memory 902 by other components of device 900, such as CPU 920 and the peripherals interface 918, may be controlled by memory controller 922.

Peripherals interface 918 can be used to couple input and output peripherals of the device to CPU 920 and memory 902. The one or more processors 920 run or execute various software programs and/or sets of instructions stored in memory 902 to perform various functions for device 900 and to process data.

In some embodiments, peripherals interface 918, CPU 920, and memory controller 922 may be implemented on a single chip, such as chip 904. In some other embodiments, they may be implemented on separate chips.

RF (radio frequency) circuitry 908 receives and sends RF signals, also called electromagnetic signals. RF circuitry 908 converts electrical signals to/from electromagnetic signals and communicates with communications networks and other communications devices via the electromagnetic signals. RF circuitry 908 may include well-known circuitry for performing these functions, including but not limited to an antenna system, an RF transceiver, wireless communication transceiver, one or more amplifiers, a tuner, one or more oscillators, a digital signal processor, a CODEC chipset, a subscriber identity module (SIM) card, memory, and so forth. RF circuitry 908 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document. In some embodiments, RF circuitry 908 may establish one or more wireless ad hoc network links, and exchange signals over same, with one or more remote devices. Such ad hoc communication includes point-to-point wireless ad hoc communication, including communication over one or more wireless ad hoc network links. A wireless ad hoc network link can include a mobile ad hoc network link.

Audio circuitry 910, speaker 911, and microphone 913 provide an audio interface between a user and device 900. Audio circuitry 910, which can include one or more audio communication interfaces, receives audio data from peripherals interface 918, converts the audio data to an electrical signal, and transmits the electrical signal to speaker 911. Speaker 911 converts the electrical signal to human-audible sound waves. Audio circuitry 910 also receives electrical signals converted by microphone 913 from sound waves. Audio circuitry 910 converts the electrical signal to audio data and transmits the audio data to peripherals interface 918 for processing. Audio data may be retrieved from and/or transmitted to memory 902 and/or RF circuitry 908 by peripherals interface 918. In some embodiments, audio circuitry 910 also includes a headset jack (e.g., 1012, FIG. 10). The headset jack provides an interface between audio circuitry 910 and removable audio input/output peripherals, such as output-only headphones or a headset with both output (e.g., a headphone for one or both ears) and input (e.g., a microphone).

I/O subsystem 906 couples input/output peripherals on device 900, such as touch screen 912 and other input control devices 916, to peripherals interface 918. I/O subsystem 906 may include display controller 956 and one or more input controllers 960 for other input or control devices. The one or more input controllers 160 receive/send electrical signals from/to other input or control devices 916. The other input control devices 916 may include physical buttons (e.g., push buttons, rocker buttons, etc.), dials, slider switches, joysticks, click wheels, and so forth. In some alternative embodiments, input controller(s) 960 may be coupled to any (or none) of the following: a keyboard, infrared port, USB port, and a pointer device such as a mouse. The one or more buttons (e.g., 1008, FIG. 10) may include an up/down button for volume control of speaker 911 and/or microphone 913. The one or more buttons may include a push button (e.g., 1006, FIG. 10).

Touch-sensitive display 912 provides an input interface and an output interface between the device and a user. Display controller 956 receives and/or sends electrical signals from/to touch screen 912. Touch screen 912 displays visual output to the user. The visual output may include graphics, text, icons, video, and any combination thereof (collectively termed "graphics"). In some embodiments, some or all of the visual output may correspond to user-interface objects.

Touch screen 912 has a touch-sensitive surface, sensor or set of sensors that accepts input from the user based on haptic and/or tactile contact. Touch screen 912 and display controller 956 (along with any associated modules and/or sets of instructions in memory 902) detect contact (and any movement or breaking of the contact) on touch screen 912 and converts the detected contact into interaction with user-interface objects (e.g., one or more soft keys, icons, web pages or images) that are displayed on touch screen 912. In an example embodiment, a point of contact between touch screen 912 and the user corresponds to a finger of the user.

Touch screen 912 may use LCD (liquid crystal display) technology, LPD (light emitting polymer display) technology, or LED (light emitting diode) technology, although other display technologies may be used in other embodiments. Touch screen 912 and display controller 956 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 912. In an example embodiment, projected mutual capacitance sensing technology may be used.

Touch screen 912 may have a video resolution in excess of 100 dots per inch (dpi). In some embodiments, the touch screen has a video resolution of approximately 160 dpi. The user may make contact with touch screen 912 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 900 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 912 or an extension of the touch-sensitive surface formed by the touch screen.

Device 900 also includes power system 962 for powering the various components. Power system 962 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 900 may also include one or more optical sensors or cameras 964. FIG. 9 shows an optical sensor coupled to optical sensor controller 958 in I/O subsystem 906. Optical sensor 964 may include charge-coupled device (CCD) or complementary metal-oxide semiconductor (CMOS) phototransistors. Optical sensor 964 receives light from the environment, projected through one or more lens, and converts the light to data representing an image. In conjunction with imaging module 943 (also called a camera module), optical sensor 964 may capture still images or video. In some embodiments, an optical sensor is located on the back of device 900, opposite touch screen display 912 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 900 may also include one or more proximity sensors 966. FIG. 9 shows proximity sensor 966 coupled to peripherals interface 918. Alternatively, proximity sensor 966 may be coupled to input controller 960 in I/O subsystem 906. In some embodiments, the proximity sensor turns off and disables touch screen 912 when the multifunction device is placed near the user's ear (e.g., when the user is making a phone call).

Device 900 includes one or more orientation sensors 968. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 900. In some embodiments, the one or more orientation sensors include any combination of orientation/rotation sensors. FIG. 9 shows the one or more orientation sensors 968 coupled to peripherals interface 918. Alternatively, the one or more orientation sensors 968 may be coupled to an input controller 960 in I/O subsystem 906. In some embodiments, information is displayed on the touch screen display in a portrait view or a landscape view based on an analysis of data received from the one or more orientation sensors.

In some embodiments, the software components stored in memory 902 include operating system 926, communication module (or set of instructions) 928, contact/motion module (or set of instructions) 930, graphics module (or set of instructions) 932, text input module (or set of instructions) 934, Global Positioning System (GPS) module (or set of instructions) 935, arbiter module 957 and applications (or sets of instructions) 936. Furthermore, in some embodiments memory 902 stores device/global internal state 957. Device/global internal state 957 includes one or more of: active application state, indicating which applications, if any, are currently active; display state, indicating what applications, views or other information occupy various regions of touch screen display 912; sensor state, including information obtained from the device's various sensors and input control devices 916; and location information concerning the device's location and/or attitude.

Operating system 926 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 928 facilitates communication with other devices over one or more external ports 924 and also includes various software components for handling data received by RF circuitry 908 and/or external port 924. External port 924 (e.g., Universal Serial Bus (USB), FIREWIRE, etc.) is adapted for coupling directly to other devices or indirectly over a network (e.g., the Internet, wireless LAN, etc.).

Contact/motion module 930 may detect contact with touch screen 912 (in conjunction with display controller 956) and other touch sensitive devices (e.g., a touchpad or physical click wheel). Contact/motion module 930 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 930 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 930 and display controller 956 detect contact on a touchpad.

Contact/motion module 930 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 932 includes various known software components for rendering and displaying graphics on touch screen 912 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 932 stores data representing graphics to be used. Each graphic may be assigned a corresponding code. Graphics module 932 receives, from applications etc., one or more codes specifying graphics to be displayed along with, if necessary, coordinate data and other graphic property data, and then generates screen image data to output to display controller 956.

Text input module 934, which may be a component of graphics module 932, provides soft keyboards for entering text in various applications (e.g., contacts 937, e-mail 940, IM 141, browser 947, and any other application that needs text input).

GPS module 935 determines the location of the device and provides this information for use in various applications (e.g., to telephone 938 for use in location-based dialing, to camera module 943 as picture/video metadata, and to applications that provide location-based services such as weather widgets, local yellow page widgets, and map/navigation widgets).

Applications 936 may include the following modules (or sets of instructions), or a subset or superset thereof:

- contacts module 937 (sometimes called an address book or contact list);
- telephone module 938;
- video conferencing module 939;
- e-mail client module 940;
- instant messaging (IM) module 941;
- workout support module 942;
- camera module 943 for still and/or video images;
- image management module 944;
- browser module 947;
- calendar module 948;
- widget modules 949, which may include one or more of: weather widget 949-1, stocks widget 949-2, calculator widget 949-3, alarm clock widget 949-4, dictionary widget 949-5, and other widgets obtained by the user, as well as user-created widgets 949-6;
- widget creator module 950 for making user-created widgets 949-6;
- search module 951;
- video and music player module 952, which may be made up of a video player module and a music player module;
- notes module 953;
- map module 954; and/or
- online video module 955.

Examples of other applications 936 that may be stored in memory 902 include other word processing applications, other image editing applications, drawing applications, presentation applications, JAVA-enabled applications, encryption, digital rights management, voice recognition, and voice replication.

In conjunction with touch screen 912, display controller 956, contact module 930, graphics module 932, and text input module 934, contacts module 937 may be used to manage an address book or contact list (e.g., stored in application internal state 992 of contacts module 937 in memory 902), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 938, video conference 939, e-mail 940, or IM 941; and so forth.

In conjunction with RF circuitry 908, audio circuitry 910, speaker 911, microphone 913, touch screen 912, display controller 956, contact module 930, graphics module 932, and text input module 934, telephone module 938 may be used to enter a sequence of characters corresponding to a telephone number, access one or more telephone numbers in address book 937, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 908, audio circuitry 910, speaker 911, microphone 913, touch screen 912, display controller 956, optical sensor 964, optical sensor controller 958, contact module 930, graphics module 932, text input module 934, contact list 937, and telephone module 938, videoconferencing module 99 includes executable instructions to initiate, conduct, and terminate a video conference between a user and one or more other participants in accordance with user instructions.

In conjunction with RF circuitry 908, touch screen 912, display controller 956, contact module 930, graphics module 932, and text input module 934, e-mail client module 940 includes executable instructions to create, send, receive, and manage e-mail in response to user instructions. In conjunction with image management module 944, e-mail client module 940 makes it very easy to create and send e-mails with still or video images taken with camera module 943.

In conjunction with RF circuitry 908, touch screen 912, display controller 956, contact module 930, graphics module 932, and text input module 934, the instant messaging module 941 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 908, touch screen 912, display controller 956, contact module 930, graphics module 932, text input module 934, GPS module 935, map module 954, and music player module 946, workout support module 942 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 912, display controller 956, optical sensor(s) 964, optical sensor controller 958, contact module 930, graphics module 932, and image management module 944, camera module 943 includes executable instructions to capture still images or video (including a video stream) and store them into memory 902, modify characteristics of a still image or video, or delete a still image or video from memory 902.

In conjunction with touch screen 912, display controller 956, contact module 930, graphics module 932, text input module 934, and camera module 943, image management module 944 includes executable instructions to arrange, modify (e.g., edit), or otherwise manipulate, label, delete, present (e.g., in a digital slide show or album), and store still and/or video images.

In conjunction with RF circuitry 908, touch screen 912, display system controller 956, contact module 930, graphics module 932, and text input module 934, browser module 947 includes executable instructions to browse the Internet in accordance with user instructions, including searching, linking to, receiving, and displaying web pages or portions thereof, as well as attachments and other files linked to web pages.

In conjunction with RF circuitry 908, touch screen 912, display system controller 956, contact module 930, graphics module 932, text input module 934, e-mail client module 940, and browser module 947, calendar module 948 includes executable instructions to create, display, modify, and store calendars and data associated with calendars (e.g., calendar entries, to do lists, etc.) in accordance with user instructions.

In conjunction with RF circuitry 908, touch screen 912, display system controller 956, contact module 930, graphics module 932, text input module 934, and browser module 947, widget modules 949 are mini-applications that may be downloaded and used by a user (e.g., weather widget 949-1, stocks widget 949-2, calculator widget 9493, alarm clock widget 949-4, and dictionary widget 949-5) or created by the user (e.g., user-created widget 949-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 908, touch screen 912, display system controller 956, contact module 930, graphics module 932, text input module 934, and browser module 947, the widget creator module 950 may be used by a user to create widgets (e.g., turning a user-specified portion of a web page into a widget).

In conjunction with touch screen 912, display system controller 956, contact module 930, graphics module 932, and text input module 934, search module 951 includes executable instructions to search for text, music, sound, image, video, and/or other files in memory 902 that match one or more search criteria (e.g., one or more user-specified search terms) in accordance with user instructions.

In conjunction with touch screen 912, display system controller 956, contact module 930, graphics module 932, audio circuitry 910, speaker 911, RF circuitry 908, and browser module 947, video and music player module 952 includes executable instructions that allow the user to download and play back recorded music and other sound files stored in one or more file formats, such as MP3 or AAC files, and executable instructions to display, present or otherwise play back videos (e.g., on touch screen 912 or on an external, connected display via external port 924). In some embodiments, device 900 may include the functionality of an MP3 player.

In conjunction with touch screen 912, display controller 956, contact module 930, graphics module 932, and text input module 934, notes module 953 includes executable instructions to create and manage notes, to do lists, and the like in accordance with user instructions.

In conjunction with RF circuitry 908, touch screen 912, display system controller 956, contact module 930, graphics module 932, text input module 934, GPS module 935, and browser module 947, map module 954 may be used to receive, display, modify, and store maps and data associated with maps (e.g., driving directions; data on stores and other points of interest at or near a particular location; and other location-based data) in accordance with user instructions.

In conjunction with touch screen 912, display system controller 956, contact module 930, graphics module 932, audio circuitry 910, speaker 911, RF circuitry 908, text input module 934, e-mail client module 940, and browser module 947, online video module 955 includes instructions that allow the user to access, browse, receive (e.g., by streaming and/or download), play back (e.g., on the touch screen or on an external, connected display via external port 924), send an e-mail with a link to a particular online video, and otherwise manage online videos in one or more file formats, such as H.264. In some embodiments, instant messaging module 941, rather than e-mail client module 940, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 902 may store a subset of the modules and data structures identified above. Furthermore, memory 902 may store additional modules and data structures not described above.

In some embodiments, device 900 is a device where operation of a predefined set of functions on the device is performed exclusively through a touch screen and/or a touchpad. By using a touch screen and/or a touchpad as the primary input control device for operation of device 900, the number of physical input control devices (such as push buttons, dials, and the like) on device 900 may be reduced.

The predefined set of functions that may be performed exclusively through a touch screen and/or a touchpad include navigation between user interfaces. In some embodiments, the touchpad, when touched by the user, navigates device 900 to a main, home, or root menu from any user interface that may be displayed on device 900. In such embodiments, the touchpad may be referred to as a "menu button." In some other embodiments, the menu button may be a physical push button or other physical input control device instead of a touchpad.

Figure 10:
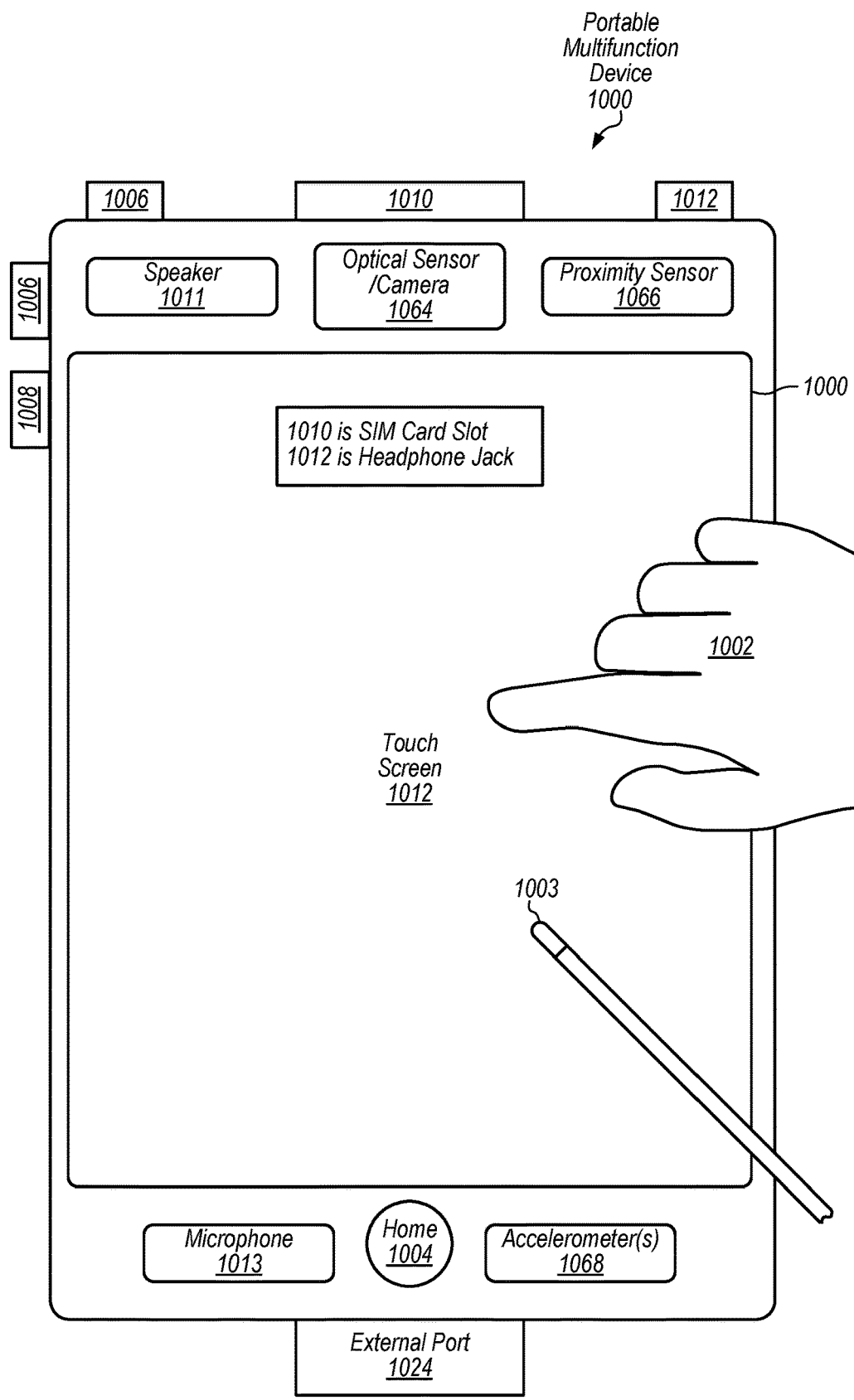
FIG. 10 illustrates a portable multifunction device having a touch screen in accordance with some embodiments.

FIG. 10 illustrates a portable multifunction device 900 having a touch screen 912 in accordance with some embodiments. The touch screen may display one or more graphics, also referred to herein as graphical representations, icons, etc., within user interface (UI) 1000. UI 1000 can include a graphical user interface (GUI). In this embodiment, as well as others described below, a user may select one or more of the graphics by making a gesture on the graphics, for example, with one or more fingers 1002 (not drawn to scale in the Figure) or one or more styluses 1003 (not drawn to scale in the figure).

Device 900 may also include one or more physical buttons, such as "home" or menu button 1004. As described previously, menu button 1004 may be used to navigate to any application 936 in a set of applications that may be executed on device 900. Alternatively, in some embodiments, the menu button is implemented as a soft key in a graphics user interface (GUI) displayed on touch screen 912.

In one embodiment, device 900 includes touch screen 912, menu button 1004, push button 1006 for powering the device on/off and locking the device, volume adjustment button(s) 1008, Subscriber Identity Module (SIM) card slot 1010, head set jack 1012, and docking/charging external port 924. Push button 1006 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 900 also may accept verbal input for activation or deactivation of some functions through microphone 913.

It should be noted that, although many of the examples herein are given with reference to optical sensor/camera 964 (on the front of a device), a rear-facing camera or optical sensor that is pointed opposite from the display may be used instead of or in addition to an optical sensor/camera 964 on the front of a device. Embodiments of an actuator module 100 that includes passive damping for optical image stabilization (OIS) may be used in the optical sensor/camera(s) 964.

Example Computer System

Figure 11:
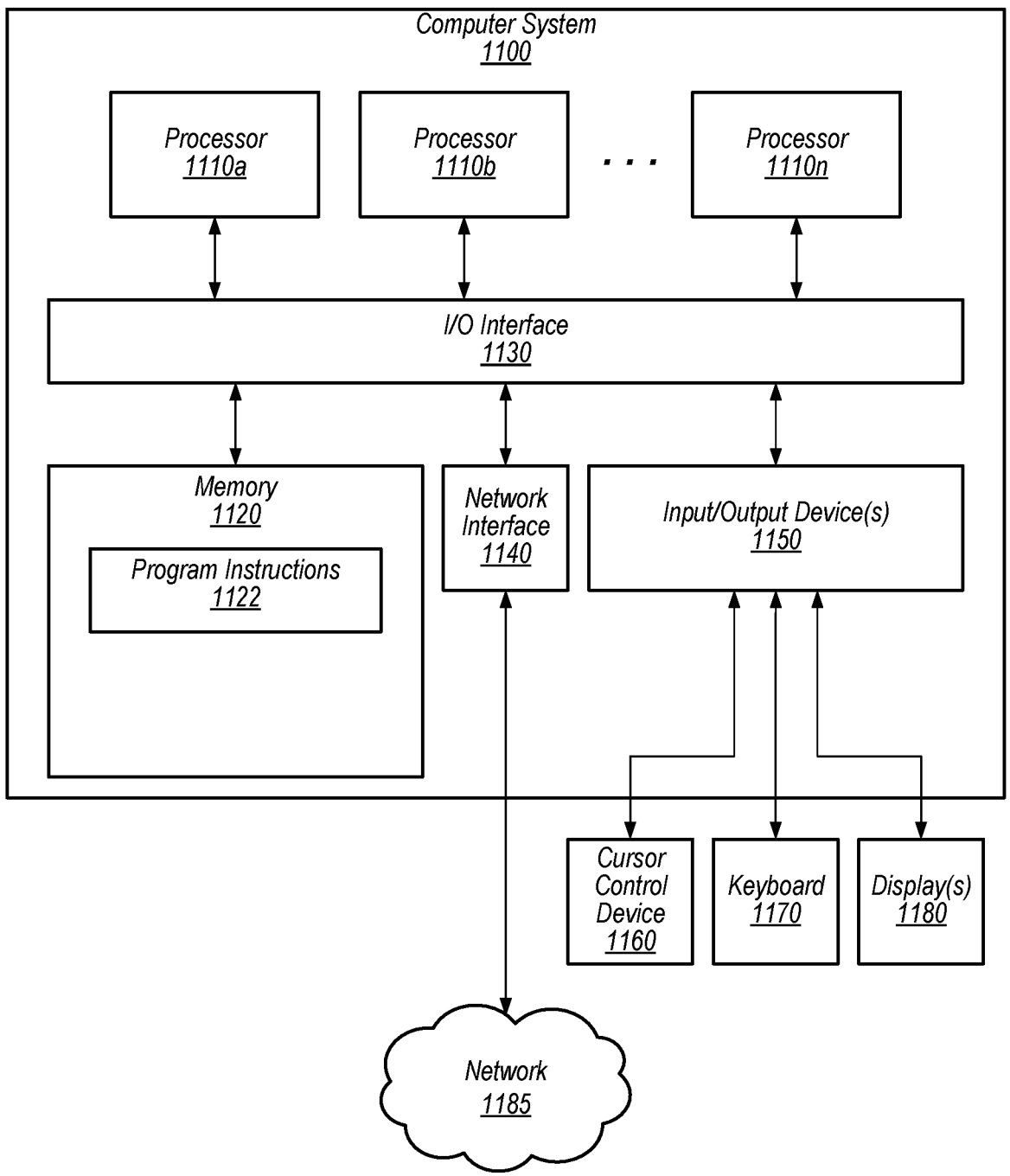
FIG. 11 illustrates an example computer system that may be configured to include or execute any or all of the embodiments described above.

FIG. 11 illustrates an example computer system 1100 that may be configured to include or execute any or all of the embodiments described above. In different embodiments, computer system 1100 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a point-to-point wireless ad hoc voice communication system, as described herein, may be executed in one or more computer systems 1100, which may interact with various other devices. Note that any component, action, or functionality described above with respect to FIGS. 1 through 10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store camera control program instructions 1122 and/or voice communication control data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement a point-to-point voice communication application incorporating any of the functionality described above. Additionally, program instructions 1122 of memory 1120 may include any of the information or data structures described above. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a wireless interface; and
one or more processors and memory configured to:
   determine one or more other devices within a direct communication range of the device;
   display, in a graphical user interface (GUI), graphical representations of the one or more other devices that are within the direct communication range of the device and relative directions of the one or more other devices with respect to a reference orientation of the device;
   receive an input selecting at least one of the one or more other devices; and
   transmit, using the wireless interface, one or more requests to establish a point-to-point or point-to-multi-point voice communication session between the device as an endpoint and the at least one of the one or more other devices as at least one other endpoint for the voice communication session.

2. The device of claim 1, wherein the device is configured receive a response from the at least one of the one or more other devices to establish the voice communication session, wherein the voice communication session is established over an ad hoc point-to-point network link between the device and the at least one of the one or more other devices that does not include any intermediary devices.

3. The device of claim 1, wherein to determine the one or more other devices, the device is configured to:
   responsive to a user command, perform a search for the one or more other devices that are within the direct communication range of the device.

4. The device of claim 3, wherein the GUI is configured to receive the input selecting the at least one of the one or more other devices.

5. The device of claim 4, wherein the device is configured to display, in the GUI, one or more additional devices that are outside the direct communication range and not sufficiently close to establish a direct voice communication session but within an outer range that is detectable by the device.

6. The device of claim 4, wherein the device is configured to:
   indicate, in the GUI, that a particular one of the one or more other devices does not include an application to establish the voice communication session; and
   send to the particular one of the one or more other devices an invitation to store a copy of the application on the particular device.

7. The device of claim 4, wherein the device is configured to display, in the GUI, respective user names and user images associated with the one or more other devices within the direct communication range.

8. The device of claim 3, wherein to receive the input selecting the at least one of the one or more other devices, the device is configured to receive an audio command, and the device is further configured to:
   indicate the one or more other devices that are within the direct communication range of the device using an audio interface of the device.

9. The device of claim 1, wherein to transmit the request to establish the voice communication session, the device is configured to include in the request an identifier of the device and a link request message asking a user to accept the request.

10. A method, comprising:
performing, by a device:
   determining one or more remote devices within a direct communication range of the device;
   displaying, in a graphical user interface (GUI), graphical representations of the one or more remote devices that are within the direct communication range of the device and relative directions of the one or more remote devices with respect to a reference orientation of the device;
   receiving input selecting at least one of the one or more remote devices; and
   transmitting one or more requests to establish a point-to-point or point-to-multi-point voice communication session between the device as an endpoint and the at least one of the one or more remote devices as at least one other endpoint for the voice communication session.

11. The method of claim 10, wherein transmitting the requests comprises transmitting a request to establish an ad hoc point-to-point network link between the device and the at least one of the one or more remote devices, wherein the link does not include any intermediary devices.

12. The method of claim 10, further comprising:
   responsive to a user command, performing a search for the one or more remote devices that are within the direct communication range of the device; and
   displaying, in the GUI of the device, the one or more remote devices that are within the direct communication range, wherein the GUI is configured to receive the input selecting the at least one of the one or more remote devices.

13. The method of claim 12, wherein displaying the ether one or more remote devices comprises displaying respective user names and user images associated with the one or more remote devices.

14. A non-transitory computer readable storage medium comprising program instructions that, when executed by one or more processors of a device, cause the device to:
   determine one or more remote devices within a direct communication range of the device;
   display, in a graphical user interface (GUI), graphical representations of the one or more remote devices that are within the direct communication range of the device and relative directions of the one or more remote devices with respect to a reference orientation of the device;
   receive input selecting at least one of the one or more remote devices; and
   transmit one or more requests to establish a point-to-point or point-to-multi-point voice communication session between the device as an endpoint and the at least one of the one or more remote devices as at least one other endpoint for the voice communication session.

15. The non-transitory computer readable storage medium of claim 14, wherein the program instructions when executed by the one or more processors cause the device to:
   receive a response from the at least one of the one or more remote devices to establish the voice communication session, wherein the voice communication session is established over an ad point-to-point network link between the device and the at least one of the one or more remote devices that does not include any intermediary devices.

16. The non-transitory computer readable storage medium of claim 14, wherein the program instructions when executed by the one or more processors cause the device to:

responsive to a user command, perform a search for the one or more remote devices that are within the direct communication range of the device; and display, in the GUI of the device, the one or more remote devices that are within the direct communication range, wherein the GUI is configured to receive the input selecting the at least one of the one or more remote devices.

17. The non-transitory computer readable storage medium of claim 16, wherein the program instructions when executed by the one or more processors cause the device to:

indicate, in the GUI, that a particular one of the one or more remote devices does not include an application to establish the voice communication session; and send to the particular one of the one or more other device an invitation to store a copy of the application on the particular device.

18. The non-transitory computer readable storage medium of claim 14, wherein the program instructions when executed by the one or more processors cause the device to:

responsive to a first audio command, perform a search for the one or more remote devices that are within the direct communication range of the device;

indicate the one or more remote devices that are within the direct communication range of the device via an audio interface of the device.

* * * * *

UNITED STATES PATENT AND TRADEMARK OFFICE
CERTIFICATE OF CORRECTION

PATENT NO. : 10,728,939 B2  
APPLICATION NO. : 16/112555  
DATED : July 28, 2020  
INVENTOR(S) : Esge B. Andersen and Cedrik Bacon It is certified that error appears in the above-identified patent and that said Letters Patent is hereby corrected as shown below:

On the Title Page

Item (54) and in the Specification, Column 1, Lines 1-2, the title, given as "Point-To-Point Ad Hoc Voice Communications" should read -- Point-To-Point Ad Hoc Voice Communication --;

In the Claims

Column 50, Line 33, in Claim 13, delete "the ether" and insert -- the --; and

Column 51, Line 15, in Claim 17, delete "device" and insert -- devices --.

Signed and Sealed this  
Twentieth Day of October, 2020

Andrei Iancu  
*Director of the United States Patent and Trademark Office*